(12) United States Patent
Kobayashi

(10) Patent No.: US 10,097,008 B2
(45) Date of Patent: Oct. 9, 2018

(54) POWER NETWORK SYSTEM AND CONTROL METHOD THEREOF, COMPUTER READABLE MEDIA, POWER ROUTER AND MANAGEMENT SERVER

(71) Applicant: NEC Corporation, Tokyo (JP)

(72) Inventor: Noriaki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 14/917,715

(22) PCT Filed: Sep. 4, 2014

(86) PCT No.: PCT/JP2014/004560
§ 371 (c)(1),
(2) Date: Mar. 9, 2016

(87) PCT Pub. No.: WO2015/037212
PCT Pub. Date: Mar. 19, 2015

(65) Prior Publication Data
US 2016/0218516 A1 Jul. 28, 2016

(30) Foreign Application Priority Data
Sep. 10, 2013 (JP) .................... 2013-186889

(51) Int. Cl.
*G06F 19/00* (2018.01)
*H02J 4/00* (2006.01)
(Continued)

(52) U.S. Cl.
CPC ............... *H02J 4/00* (2013.01); *G05B 19/10* (2013.01); *H02J 3/00* (2013.01); *H02J 13/0006* (2013.01);
(Continued)

(58) Field of Classification Search
CPC ............ G05B 19/10; G05B 2219/2639; H02J 13/0006; H02J 3/00; H02J 4/00; Y02P 80/14
See application file for complete search history.

(56) References Cited

U.S. PATENT DOCUMENTS 8,447,435 B1 * 5/2013 Miller ................. G06F 1/263
  700/286
2004/0061380 A1 * 4/2004 Hann .................. H02J 1/06
  307/43

(Continued)

FOREIGN PATENT DOCUMENTS

JP  4-193030      7/1992
JP  2010-252625  11/2010
(Continued)

OTHER PUBLICATIONS

International Search Report and Written Opinion dated Oct. 7, 2014 in corresponding PCT International Application.

*Primary Examiner* — Kidest Bahta
(74) *Attorney, Agent, or Firm* — Finnegan, Henderson, Farabow, Garrett & Dunner, L.L.P.

(57) ABSTRACT

A control or management of a power router is more adequately performed when constructing a power network system in which power cells are asynchronously connected with each other. The power network system includes a first power router, a second power router and a management server. The first power router transmits power. The second power router receives the power from the first power router and the obtain information indicating the received power. The management server controls the power transmitted by the first power router base on the information indicating the received power.

22 Claims, 30 Drawing Sheets

(51) Int. Cl.
*H02J 3/00* (2006.01)
*H02J 13/00* (2006.01)
*G05B 19/10* (2006.01)

(52) U.S. Cl.
CPC ....... *G05B 2219/2639* (2013.01); *Y02P 80/14* (2015.11)

(56) References Cited

U.S. PATENT DOCUMENTS

| | | | |
|---|---|---|---|
| 2004/0249516 A1* | 12/2004 | Seto | B60L 11/1824 700/295 |
| 2008/0143304 A1* | 6/2008 | Bose | H02J 3/06 323/205 |
| 2011/0208367 A1* | 8/2011 | Sackman | H02J 3/14 700/295 |
| 2011/0270453 A1 | 11/2011 | Kalogridis et al. | |
| 2012/0173035 A1* | 7/2012 | Abe | H02J 3/00 700/297 |
| 2013/0088084 A1 | 4/2013 | Szu | |

FOREIGN PATENT DOCUMENTS

| | | |
|---|---|---|
| JP | 2011-182641 | 9/2011 |
| JP | 4783453 | 9/2011 |
| JP | 2011-244681 | 12/2011 |
| JP | 2013-520945 | 6/2013 |

\* cited by examiner

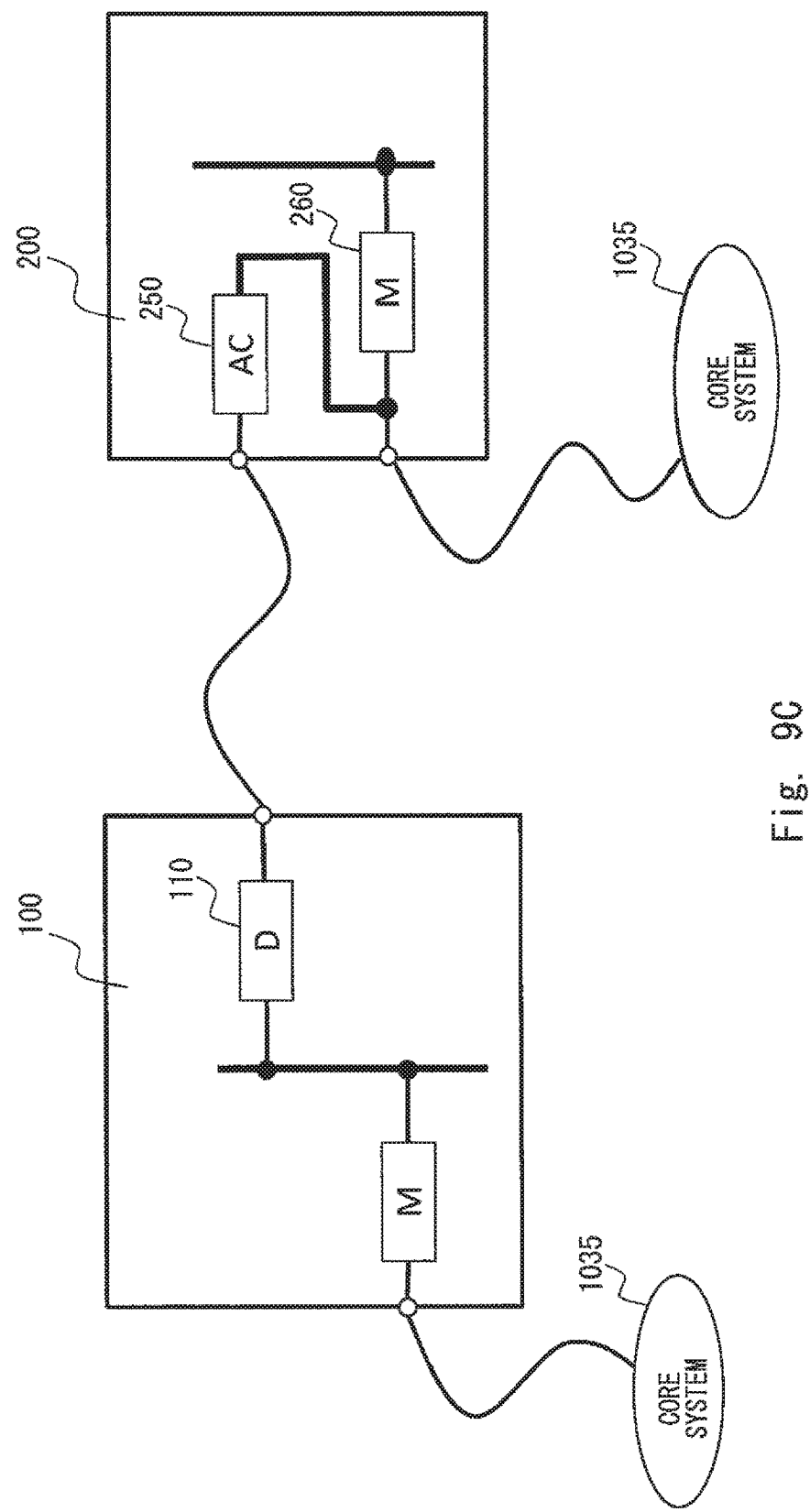

| FIRST POWER ROUTER \ SECOND POWER ROUTER | MASTER LEG | DESIGNATED POWER TRANSMISSION/RECEPTION LEG | STAND-ALONE LEG | AC-THROUGH |
|---|---|---|---|---|
| MASTER LEG | UN-CONNECTABLE | UN-CONNECTABLE | CONNECTABLE | CONNECTABLE |
| DESIGNATED POWER TRANSMISSION/ RECEPTION LEG | UN-CONNECTABLE | UN-CONNECTABLE | CONNECTABLE | CONNECTABLE |
| STAND-ALONE LEG | CONNECTABLE | CONNECTABLE | UN-CONNECTABLE | CONNECTABLE |
| AC-THROUGH | CONNECTABLE | CONNECTABLE | CONNECTABLE | CONNECTION IS USELESS |

Fig. 11

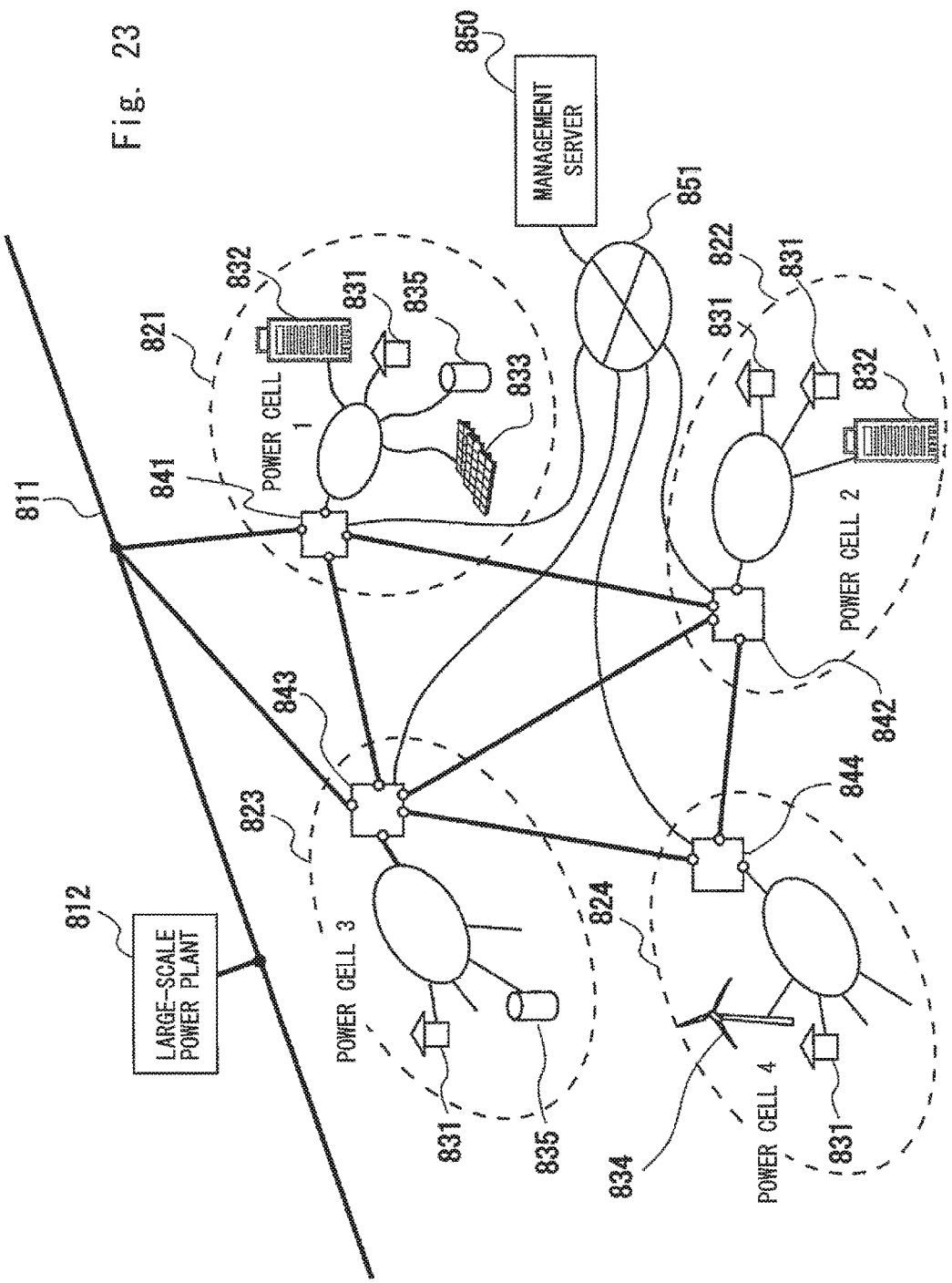

POWER NETWORK SYSTEM AND CONTROL METHOD THEREOF, COMPUTER READABLE MEDIA, POWER ROUTER AND MANAGEMENT SERVER

CROSS-REFERENCE TO RELATED PATENT APPLICATIONS

This application is a National Stage Entry of International Application No. PCT/JP2014/004560, filed Sep. 4, 2014, which claims priority from Japanese Patent Application No. 2013-186889, filed Sep. 10, 2013. The entire contents of the above-referenced applications are expressly incorporated herein by reference.

TECHNICAL FIELD

The present invention relates to power network system and control method thereof, computer readable media, power router and management server

BACKGROUND ART

When a power supply system is constructed, important challenges are not only to safely expand a power transmission network but also to construct the system so that a large quantity of natural energy can be introduced into the system in the future. Therefore, as a new power network, a power network system called "digital grid" (registered trademark) has been proposed (Patent Literatures 1 and 2).

The digital grid (registered trademark) is a power network system in which a power network is sub-divided into small cells and these cells are connected with each other in an asynchronous manner. The size of each power cell ranges from a smaller one such as a cell corresponding to one house, one building, or one commercial facility to a larger one such as a cell corresponding to one prefecture or one municipality. Each power cell includes loads and, in some cases, a generator facility and/or a power storage facility. Examples of the generator facility include generator facilities using natural energy such as a solar generator, an aerogenerator, and a geothermal power plant.

Power cells are asynchronously connected to freely generate power inside each power cell or smoothly interchange power between power cells. That is, even when a plurality of power cells are connected with other, a voltage, a phase and a frequency of power used in each power cell are out of synchronization with other power cells. FIG. 23 is a view illustrating an example of a power network system 810. In FIG. 23, a core system 811 feeds core power from a large-scale power plant 812. Further, a plurality of power cells 821 to 841 are installed. Each of the power cells 821 to 824 includes loads such as a house 831 and a building 832, power generation facilities (e.g. a solar panel 833 and a wind power generator 834) and a power storage facility (e.g. a storage battery 835).

In addition, in this description, power generation facilities and power storage facilities will be collectively referred to as distributed power supplies.

Further, the power cells 821 to 824 include power routers 841 to 844 which are connections (connection ports) for connecting with other power cells and the core system 811, respectively. The power routers 841 to 844 include a plurality of legs. (For convenience of the drawings, reference numerals of the legs will not be indicated in FIG. 23, and white circles attached to the power routers 841 to 844 are connection terminals of the respective legs.) In this regard, a leg includes a connection terminal and a power converting unit, and each leg is allocated an address.

In addition, power conversion in a leg refers to converting an alternating current into a direct current or a direct current into an alternating current, or changing the voltage, the frequency or the phase of power.

All power routers 841 to 844 are connected to a management server 850 through a communication network 860, and the management server 850 integrally controls operations of all power routers 841 to 844. For example, the management server 850 instructs each of the power routers 841 to 844 to feed power or receive power per leg. Thus, power is interchanged between power cells through the power routers 841 to 844.

By interchanging power between power cells, for example, one power generation facility (e.g. the solar panel 833 or the wind power generator 834) or one power storage facility (e.g. the storage battery 835) can be shared between a plurality of power cells. When power cells mutually interchange extra power, a power demand and supply balance can be stably kept while substantially reducing facility cost.

CITATION LIST

Patent Literature

Patent Literature 1: Japanese Patent No. 4783453
Patent Literature 2: Japanese Published patent application No. 2011-182641

SUMMARY OF INVENTION

Technical Problem

Enabling asynchronous connection between a plurality of power cells through power routes brings a great advantage, and therefore putting the power routers in practical use earlier is expected.

However, actually putting the power routers in practical use involves a unique problem that a conventional power transmission and distribution system has never faced. Currently, a mainstream power transmission and distribution system assumes a power system whose voltage, phase and frequency completely synchronize with each other, and therefore power routers which connect power systems whose voltages, phases or frequencies are different need to take into account a new problem.

When designated power is transmitted and received between power routers, a target value of the received power of a transmission-side power router may not be received by a reception-side power router. For example, due to loss of the transmission line, conversion efficiency, voltage, phase or the like, a value may be smaller (or larger) than the target value in the reception-side power router.

The present invention has been made in light of the above situation. An object of the present invention is to more adequately manage a power router to construct a power network system in which power cells are asynchronously connected with each other.

Solution to Problem

An aspect of the present invention is a power network system that including: a first power router configured to transmit power; a second power router configured to receive the power from the first power router and obtain information indicating received power; and a management server configured to control the power transmitted by the first power router based on the information indicating the received power.

An aspect of the present invention is a power network system including: a first power router configured to transmit power; a second power router configured to receive the power from the first power router and obtain information indicating received power. The first power router comprises power correction means for controlling the power transmitted by the first power router based on the information indicating the received power.

An aspect of the present invention is a power network system including: a first power router configured to transmit power; a second power router configured to receive the power from the first power router and obtain information indicating received power. The second power router comprises power correction means for controlling the power transmitted by the first power router based on the information indicating the received power.

An aspect of the present invention is a power router including a control measure for controlling power transmitted to another power router based on information indicating power received by the other power router.

An aspect of the present invention is a power router controlling power transmitted to the other power router to decrease a difference between the power received by the other power router indicated by information relating to the power received by the other power router and a target value of power to be received by the other power router.

An aspect of the present invention is a power router: obtaining information indicating power received by another power router from the other power router, and controlling power transmitted by the other power router based on the information indicating the received power.

An aspect of the present invention is a power router including: a DC bus of which the voltage is kept at a voltage level; a plurality of power converting legs having functions of bi-directionally converting power between a first connection terminal and a second connection terminal, the first connection terminals of the plurality of power converting legs being connected to the DC bus, the second connection terminals of the plurality of power converting legs being connected to outside destinations as external connection terminals; and control means for controlling operations of the plurality of power converting legs. Any of the plurality of power converting legs receives the power from another power router transmitting power at a first setting power and the other power router includes power correction means for performing a control to cause power received from the other power router to be the first setting power, and the control means the power received from the other power router and outputs a measurement result to the power correction means of the other power router.

An aspect of the present invention is a non-transitory computer readable media storing a management device control program, the program causing a computer to execute: a step of causing a first power router to transmit power to a second power router at a first setting power; a step of causing the second power router to measure power received by the second power router; and a step of controlling the power transmitted from the first power router to cause the power received by the second power router to be the first setting power.

An aspect of the present invention is a management server: causing a first power router to transmit power to a second power router at a first setting power; causing the second power router to measure power received by the second power router; controlling the power transmitted from the first power router to cause the power received by the second power router to be the first setting power.

An aspect of the present invention is a control method of a power network system including; causing a first power router to transmit power to a second power router at a first setting power; causing the second power router to measure power received by the second power router; controlling the power transmitted from the first power router to cause the power received by the second power router to be the first setting power.

Advantageous Effects of Invention

According to the present invention, it is possible to more adequately manage a power router to construct a power network system in which power cells are asynchronously connected with each other.

BRIEF DESCRIPTION OF DRAWINGS

FIG. 9C is a diagram showing an example of a combination of power routers whose connection is permitted when an AC-through leg is taken into consideration;

FIG. 11 is a diagram showing patterns of a combination of power routers when the power routers are connected to each other;

FIG. 23 is a diagram showing an example of a power network system 810.

DESCRIPTION OF EMBODIMENTS

Figure 1:
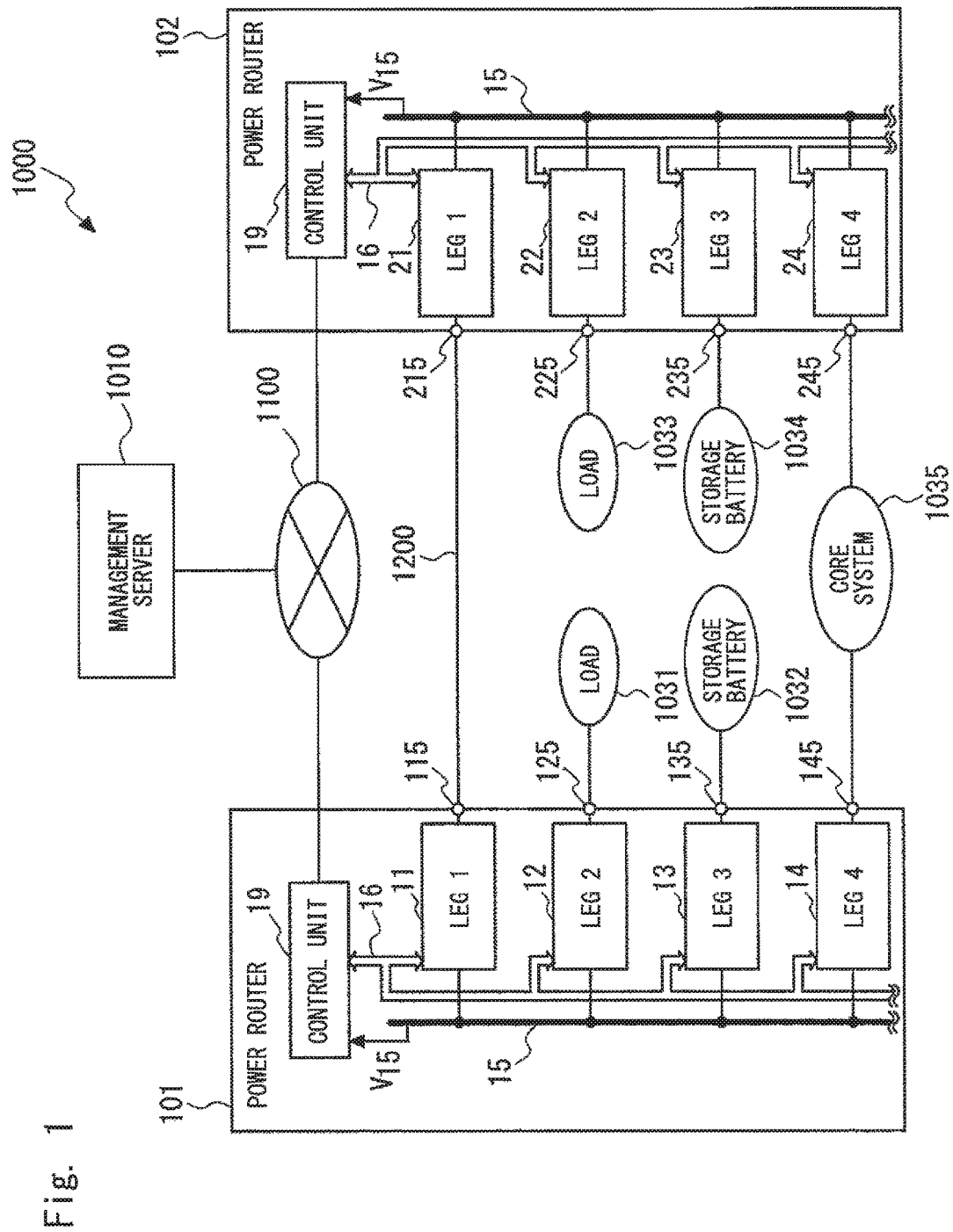
FIG. 1 is a block diagram illustrating a schematic configuration of a power network system 1000 according to a first embodiment.

Embodiments of the present invention will be described below with reference to the drawings. The same elements will be assigned the same reference numerals in each drawing, and will not be described when necessary.

First Embodiment

A power router 100 according to a first embodiment will be described. FIG. 1 is a block diagram illustrating a schematic configuration of the power network system 1000 according to the first embodiment. The power network system 1000 includes a management server 1010 and a plurality of power routers. In the present embodiment, an example where the power network system 1000 includes the management server 1010, power routers 101 and 102, a transmission line 1200 will be described. The power routers 101 and 102 are specific examples of the power routers 841 to 844 described above (FIG. 23). Note that the management server is also referred to as a management measure.

The power network system 1000 and power network systems described in following embodiments have a configuration for correcting power transmission loss between the power routers by controlling power. In general, when transmitting the power thorough a transmission line, the power transmission loss occurs due to differences in length or path of the transmission line. Therefore, power received by a reception-side is smaller than output power of a transmission-side even when the power is transmitted from the transmission-side at a certain power. Accordingly, the power network system 1000 and the power network systems described in the following embodiments has a function for controlling the output power of the transmission-side to cause the power received by the reception-side to be an appropriate value.

The power router 101 roughly includes a direct current (DC) bus 15, a communication bus 16, a first leg 11, a second leg 12, a third leg 13, a fourth leg 14 and a control unit 19. In addition, in FIG. 1, the first leg to the fourth leg are indicated as a leg 1 to a leg 4, respectively, for convenience of the drawings. The first leg 11, the second leg 12, the third leg 13 and the fourth leg 14 are connected to the outside through a terminals 115, 125, 135 and 145, respectively.

The DC bus 15 is connected with the first leg 11 to the fourth leg 14 in parallel. The DC bus 15 feeds DC power. The control unit 19 maintains a bus voltage $V_{15}$ of the DC bus 15 at a fixed value by controlling operation states of the first leg 11 to the fourth leg 14 (an operation of feeding power to an outside, an operation of receiving power from the outside and the like) through a communication bus 16. That is, the power router 101 is connected to the outside through the first leg 11 to the fourth leg 14, and converts all power which is interchanged with the outside, into DC power once and flows the DC power on the DC bus 15. By converting power into DC power once, power cells can be asynchronously connected even when frequencies, voltages or phases are different.

Figure 2:
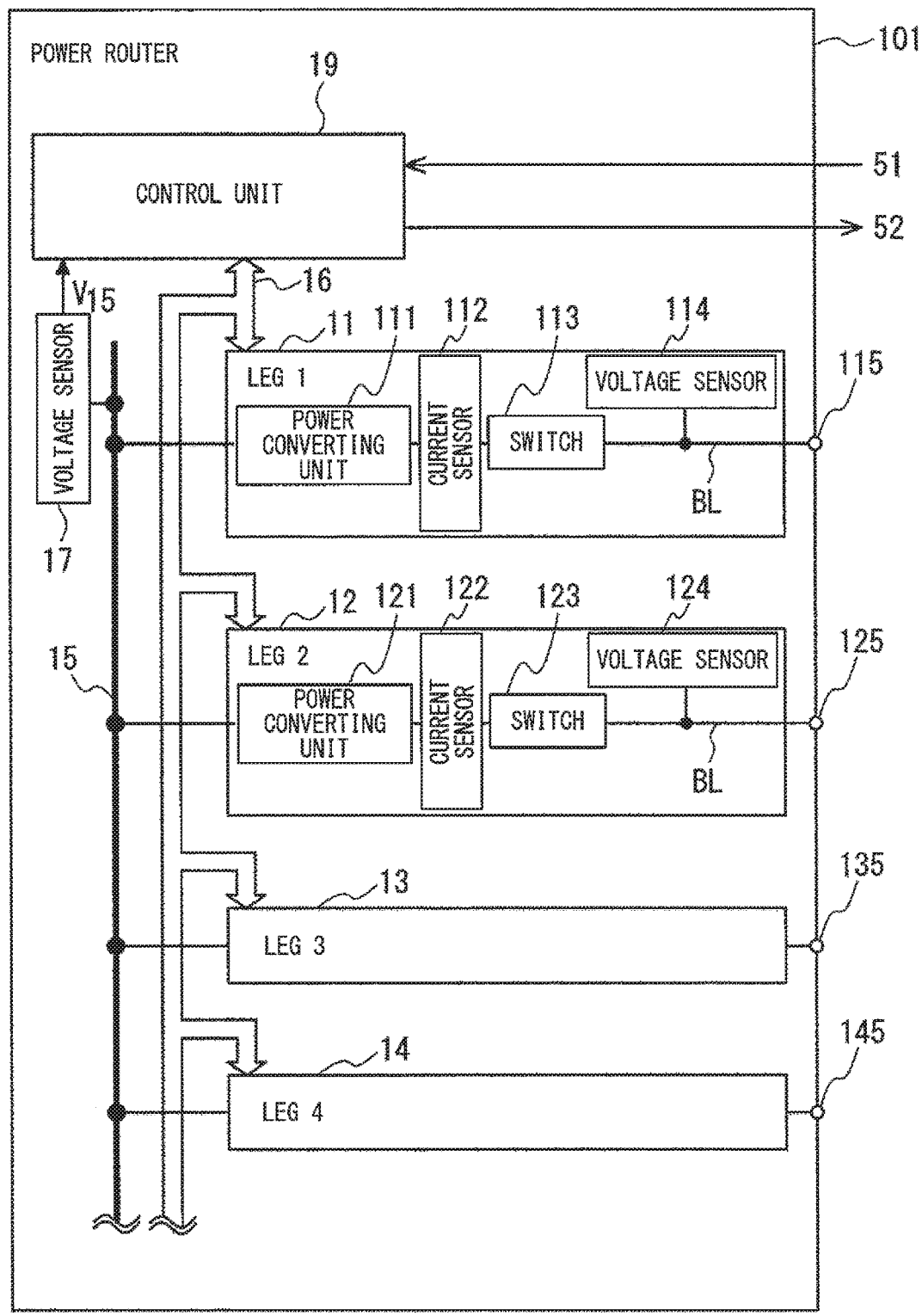
FIG. 2 is a block diagram of a power router 101 illustrating an example of internal structures of legs.

A configuration of the power router 101 will be described in detail. FIG. 2 is a block diagram of the power router 101 illustrating an example of internal structures of the legs. The first leg 11 to the fourth leg 14 employ the same configuration. However, for simplification of the drawings, FIG. 2 illustrates the internal structures of the first leg 11 and the second leg 12, and does not illustrate the internal structures of the third leg 13 and the fourth leg 14.

The first leg 11 to the fourth leg 14 are provided to the DC bus 15 in parallel. As described above, the first leg 11 to the fourth leg 14 employ the same configuration. In addition, an example where the power router 101 includes four legs will be described in the present embodiment. However, the present embodiment is only exemplary. The power router can be provided with an arbitrary number of legs equal to or more than two legs. In the present embodiment, the first leg 11 to the fourth leg 14 employ the same configuration. However, the two or more legs included in the power router may employ the same configuration or different configurations. In addition, a leg will be also referred to as a power converting leg below.

As illustrated in FIG. 2, the first leg 11 includes a power converting unit 111, a current sensor 112, a switch 113 and a voltage sensor 114. The first leg 11 is connected to, for example, the transmission line 1200 through a connection terminal 115. The power converting unit 111 converts alternating current (AC) power into DC power or DC power into AC power. DC power flows in the DC bus 15, i.e., the power converting unit 111 converts the DC power of the DC bus 15 into AC power of a fixed frequency and voltage and flows the AC power to an outside from the connection terminal 115. Alternatively, the power converting unit 111 converts the AC power flowing from the connection terminal 115 into DC power, and flows the DC power to the DC bus 15.

Figure 3:
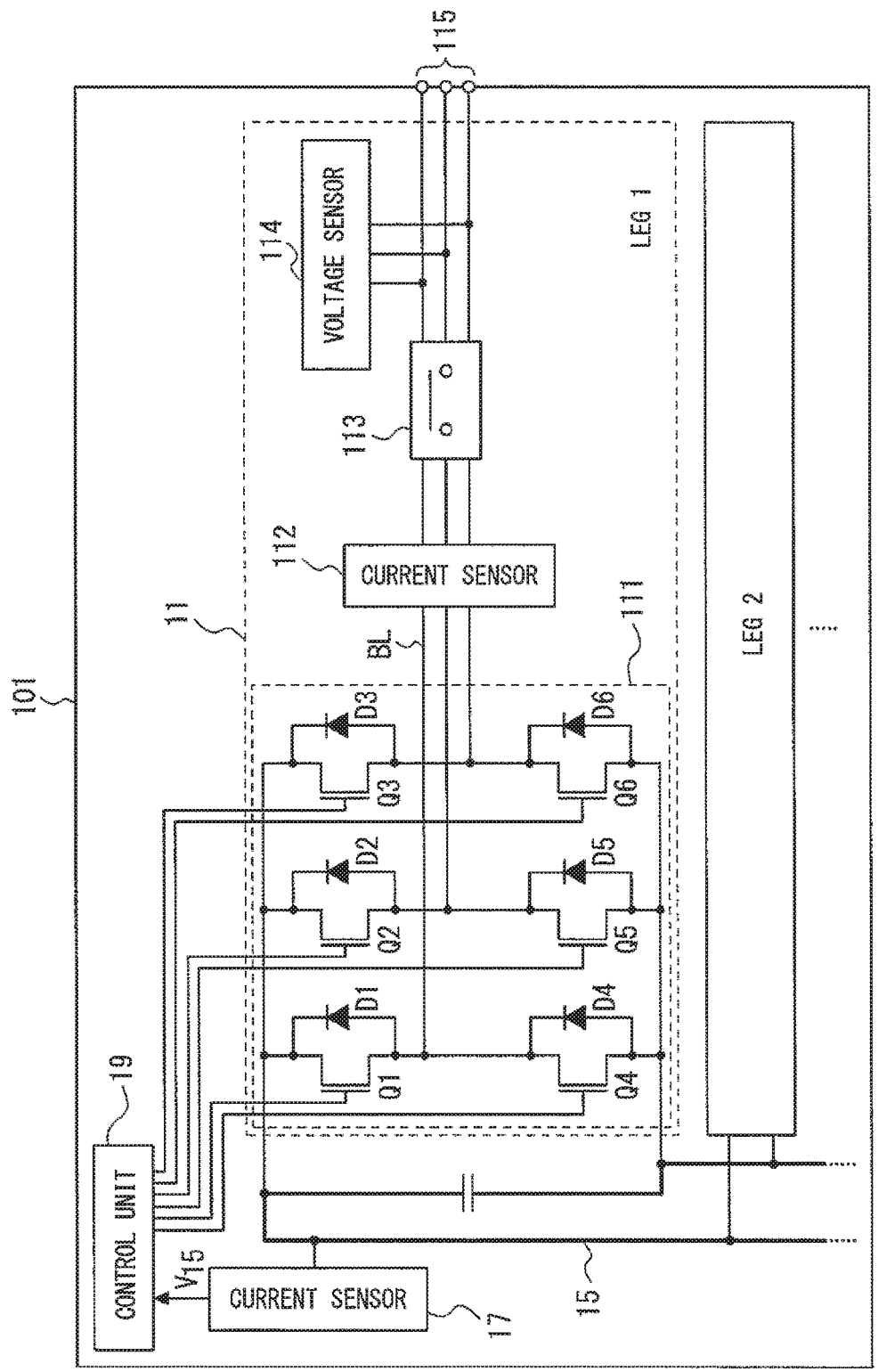
FIG. 3 is a block diagram of the power router 101 more specifically illustrating the internal structure of the leg.

A configuration of the leg will be described. FIG. 3 is a block diagram of the power router 101 more specifically illustrating the internal structure of the leg. The first leg 11 to the fourth leg 14 employ the same configuration. However, for simplification of the drawings, FIG. 3 illustrates the internal structure of the first leg 11, and does not illustrate the internal structure of the second leg 12, the third leg 13, the fourth leg 14 and the communication bus 16.

The power converting unit 111 employs a configuration of an inverter circuit. More specifically, as illustrated in FIG. 3, the power converting unit 111 includes transistors Q1 to Q6 and diodes D1 to D6. One side of each of the transistors Q1 to Q3 is connected to a high-voltage-side supply line. The other side of each of the transistors Q1 to Q3 is connected to one side of each of the transistors Q4 to Q6, respectively. The other sides of the transistors Q4 to Q6 are connected to a low-voltage-side supply line. The high-voltage-side terminals of the transistors Q1 to Q6 are connected to the cathodes of the diodes D1 to D6, respectively. The low-voltage-side terminals of the transistors Q1 to Q6 are connected to the anodes of the diodes D1 to D6, respectively.

Each phase of a three-phase alternating current is output from each of a node between the transistor Q1 and the transistor Q4, a node between the transistor Q2 and the transistor Q5, and a node between the transistor Q3 and the transistor Q6 by appropriately controlling, for example, timings of ON/OFF of the transistors Q1 to Q6.

As described above, the power converting unit 111 employs a configuration in which six antiparallel circuits consisting of the transistors and the diodes are connected by way of a three-phase bridge. Wires which are led from the node between the transistor Q1 and the transistor Q4, the node between the transistor Q2 and the transistor Q5, and the node between the transistor Q3 and the transistor Q6, and connect the nodes and the connection terminals will be referred to as branch lines BL. The three-phase alternating current is used, and therefore one leg includes the three branch lines BL in this case.

In this regard, a three-phase inverter circuit is used since the three-phase alternating current is used. However, a single-phase inverter circuit may be used depending on cases. Various types of a self-excited power converting device such as a MOSFET (Metal-Oxide-Semiconductor Field-Effect Transistor) and an IGBT (Insulated Gate Bipolar Transistor) can be used as the transistors Q1 to Q6.

The switch 113 is disposed between the power converting unit 111 and the connection terminal 115. By opening and closing this switch 113, the branch line BL is opened and closed. Thus, the DC bus 15 is isolated from or connected with the outside. The current sensor 112 and the voltage sensor 114 output detection values to the control unit 19 through the communication bus 16.

A case where the power converting unit is the inverter circuit and leg connection parties use alternating currents has been described above. However, there is also a case where a leg connection party uses a direct current similar to a storage battery (e.g. the third leg 13 in FIG. 1 is connected to the storage battery 1032). Power conversion in this case is DC-DC conversion.

Hence, by providing an inverter circuit and a converter circuit in parallel in a power converting unit, an inverter circuit and a converter circuit may be separately used according to whether a connection party uses an alternating current or a direct current. Alternatively, a DC-DC conversion dedicated leg whose a power converting unit is a DC-DC converting unit may be provided. In addition, providing a power router which has AC-DC conversion dedicated legs and DC-DC conversion dedicated legs in combination also provides more advantages in terms of a size and cost than providing an inverter circuit and a converter circuit in parallel in each of all legs.

The second leg 12 includes a power converting unit 121, a current sensor 122, a switch 123 and a voltage sensor 124. The leg 12 is connected to, for example, a load 1031 through a connection terminal 125. The power converting unit 121, the current sensor 122, the switch 123 and the voltage sensor 124 of the second leg 12 correspond to the power converting unit 111, the current sensor 112, the switch 113 and the voltage sensor 114 of the first leg 11, respectively. The connection terminal 125 connected with the second leg 12 corresponds to the connection terminal 115 connected with the first leg 11. The power converting unit 121 employs a configuration in which antiparallel circuits 121P each including a thyristor 121T and a feedback diode 121D are connected by way of a three-phase bridge. The thyristor 121T, the feedback diode 121D and the antiparallel circuit 121P correspond to the thyristor 111T, the feedback diode 111D and the antiparallel circuit 111P, respectively.

The third leg 13 includes a power converting unit 131, a current sensor 132, a switch 133 and a voltage sensor 134. The third leg 13 is connected to, for example, the storage battery 1032 through a connection terminal 135. The power converting unit 131, the current sensor 132, the switch 133 and the voltage sensor 134 of the third leg 13 correspond to the power converting unit 111, the current sensor 112, the switch 113 and the voltage sensor 114 of the first leg 11, respectively. The connection terminal 135 connected with the third leg 13 corresponds to the connection terminal 115 connected with the first leg 11. The power converting unit 131 employs a configuration in which antiparallel circuits 131P each including a thyristor T and a feedback diode 131D are connected by way of a three-phase bridge. The thyristor 131T, the feedback diode 131D and the antiparallel 131P correspond to the thyristor 111T, the feedback diode 111D and the antiparallel circuit 111P, respectively. In this regard, for simplification of the drawings, the internal structure of the third leg 13 is not illustrated in FIG. 2.

The fourth leg 14 includes a power converting unit 141, a current sensor 142, a switch 143 and a voltage sensor 144. The fourth leg 14 is connected to, for example, the core system 1035 through a connection terminal 145. The power converting unit 141, the current sensor 142, the switch 143 and the voltage sensor 144 of the fourth leg 14 correspond to the power converting unit 111, the current sensor 112, the switch 113 and the voltage sensor 114 of the first leg 11, respectively. The connection terminal 145 connected with the fourth leg 14 corresponds to the connection terminal 115 connected with the first leg 11. The power converting unit 141 employs a configuration in which antiparallel circuits 141P each including a thyristor 141T and a feedback diode 141D are connected by way of a three-phase bridge. The thyristor 141T, the feedback diode 141D and the antiparallel circuit 141P correspond to the thyristor 111T, the feedback diode 111D and the antiparallel circuit 111P, respectively. In this regard, for simplification of the drawings, the internal structure of the fourth leg 14 is not illustrated in FIGS. 2 and 3.

The control unit 19 receives a control instruction 51 from the external management server 1010 through a communication network 1100. The control instruction 51 includes information for instructing an operation of each leg of the power router 101. Further, the control unit 19 can output information indicating an operation state of the power router 101 to the management server 1010 through the communication network 1100. In addition, the operation instruction of each leg includes, for example, specifying power feeding/power reception, specifying an operation mode and specifying power to be fed or received.

More specifically, the control unit 19 monitors the bus voltage $V_{15}$ of the DC bus 15 through a voltage sensor 17, and controls a power direction, a frequency of AC power and the like. That is, the control unit 19 controls switching of the transistors Q1 to Q6 and opening/closing of the switches 113, 123, 133 and 143 through the communication bus 16.

Figure 4:
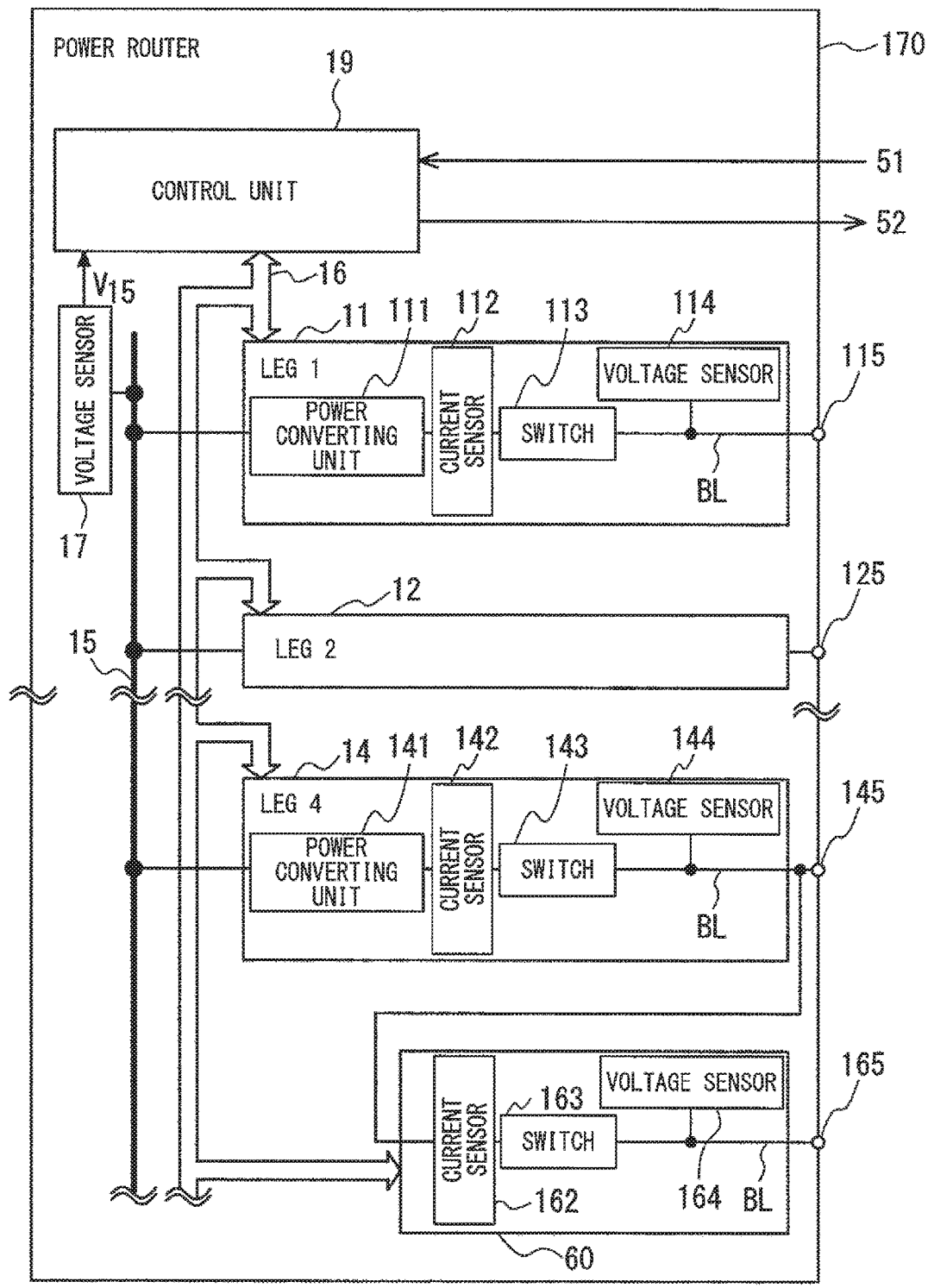
FIG. 4 is a block diagram illustrating a configuration example of a power router 170 including an AC through leg 60.

In addition, the leg having the power converting unit has been described above. However, it is also possible to provide a leg without a power converting unit. Hereinafter, the leg without the power converting unit will be temporarily referred to as an AC (Alternating Current) through leg 60. FIG. 4 is a block diagram illustrating a configuration example of a power router 170 including the AC through leg 60. The power router 170 employing a configuration provided by adding the AC through leg 60 to the power router 101 will be described. In addition, for simplification of the drawings, the third leg 13 is not illustrated in FIG. 4.

The AC through leg 60 includes a current sensor 162, a switch 163 and a voltage sensor 164. The AC through leg 60 is connected to, for example, another power cell through a connection terminal 165. A branch line BL of the AC through leg 60 is connected to the branch line BL of another leg having the power converting unit through the switch 163. That is, the connection terminal 165 connected with the AC through leg 60 is connected to a connection terminal connected with another leg including the power converting unit. FIG. 4 illustrates that, for example, the connection terminal 165 connected with the AC through leg 60 is connected to the connection terminal 145 connected with the fourth leg 14. Only the switch 163 is provided between the connection terminal 165 of the AC through leg 60 and the connection terminal 145 connected with the fourth leg 14, and the AC through leg 60 does not include a power converter. Hence, power is conducted without being converted at all between the connection terminal 165 connected with the AC through leg 60 and the connection terminal 145 connected with the fourth leg 14. This is because the leg without a power converter is referred to as an AC through leg.

Figure 5:
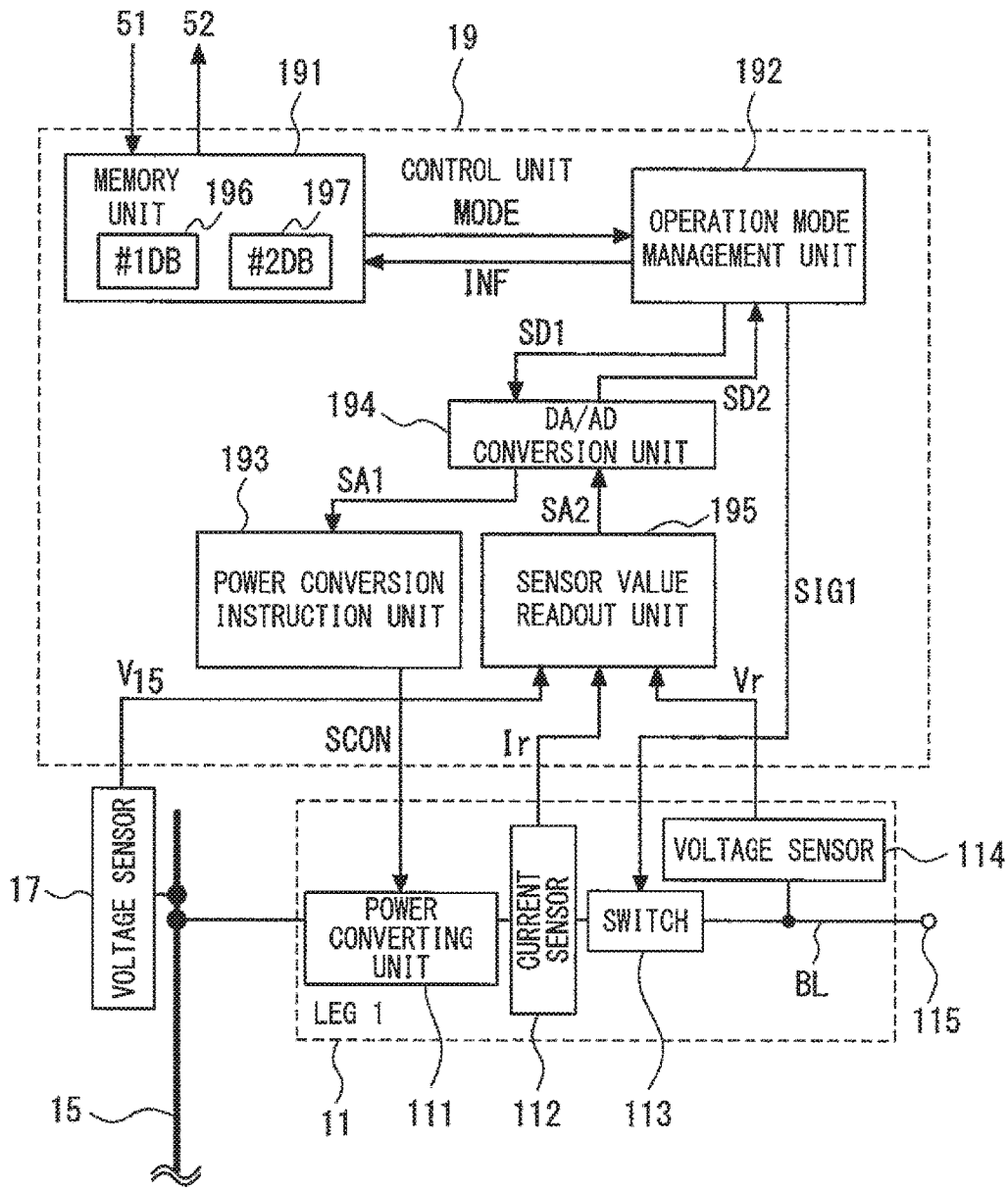
FIG. 5 is a block diagram schematically showing a relation between a configuration of a control unit 19 and the leg.

FIG. 5 is a block diagram schematically showing a relation between a configuration of the control unit 19 and the leg. In FIG. 5, the case where the control unit 19 controls the first leg 11 is represented. The control unit 19 includes a memory unit 191, an operation mode management unit 192, a power conversion instruction unit 193, a DA/AD conversion unit 194, and a sensor-value readout unit 195.

The memory unit 191 holds the control instruction 51 from the management server 1010 as a control instruction database 196 (a first database, which is represented by #1DB in the drawings). The memory unit 191 holds a leg identification information database 197 (a second database, which is represented by #2DB in the drawings) for identifying each of the first leg 11 to the fourth leg 14 as well as the control instruction database 196. The memory unit 191 can be achieved by various types of the memory unit such as a flash memory, etc. The leg identification information database 197 is information, e.g., an IP address, URL, URI and so on, allocated for specifying each of the first leg 11 to the fourth leg 14. Further, the memory unit 191 holds information 52 indicating an operation state of the power router 101 based on an information INF from the operation mode management unit 192 and outputs the information 52 indicating the operation state of the power router 101 as appropriate.

The operation mode management unit 192 is configured by a CPU, for example. The operation mode management unit 192 reads out an operation mode designation information MODE, which is included in the control instruction database 196 and designates an operation mode (the operation mode will be described below) of the deactivation target leg (the first leg 11). The operation mode management unit 192 also refers to the leg identification information database 197 in the memory unit 191 and reads out information (e.g., the IP address) corresponding to the deactivation target leg (the first leg 11). Thus, the operation mode management unit 192 can output an activation instruction with respect to the deactivation target leg (the first leg 11). The operation mode management unit 192 outputs a waveform instruction signal SD1 that is a digital signal. Further, the operation mode management unit outputs a switching control signal SIG1 to the switch in the deactivation target leg (e.g., the switch 113).

The waveform instruction signal SD1 is converted from digital to analog in the DA/AD conversion unit 194, and the converted signal is output to the power conversion instruction unit 193 as a waveform instruction signal SA1 that is an analog signal. The power conversion instruction unit 193 outputs a control signal CON to the power converting unit (e.g., the power converting unit 111) according to the waveform instruction signal SA1.

The sensor-value readout unit 195 reads the bus voltage $V_{15}$ detected by the voltage sensor 17, and a detected value Ir of the current sensor 112 and a detected value Vr of the voltage sensor 114 in the deactivation target leg (the first leg 11). The sensor-value readout unit 195 outputs a readout result as a readout signal SA2 that is an analog signal. The readout signal SA2 is converted from analog to digital in the DA/AD conversion unit 194, and the converted signal is output to the operation mode management unit 192 as a readout signal SD2 that is a digital signal. The operation mode management unit 19 outputs the information indicating the operation state of the leg to the memory unit 191 based on the readout signal SD2 that is the digital signal.

Next, an operation of the power router 101 will be described. In the present embodiment, an operation mode designation of each leg is included in the control instruction 51.

First, the operation mode will be described. As previously described, the first leg 11 to the fourth leg 14 include the power converting unit 111, 121, 131, and 141, and the switching operations of the transistors in the power converting units are controlled by the control unit 19.

Note that the power router 101 is disposed in a node of the power network system 1000 and has an important role of connecting the core system 1035, loads 1031, distributed power supplies, power cells, and so on with each other. It should be noted that the connection terminals 115, 125, 135, and 145 of the first leg 11 to the fourth leg 14 are connected to the core system 1035, loads 1031, the distributed power supplies, or the power routers of other power cells. The inventors of the present application have found that the roles of the first leg 11 to the fourth leg 14 are changed according to the entities to be connected thereto and hence the power routers do not work properly unless the first leg 11 to the fourth leg 14 perform appropriate operations according to those roles. The inventors of the present application have configured the power network system so that the ways of the operations of the legs are changed according to the entities to be connected thereto, though the configurations of the legs are identical to each other.

The way of the operation of a leg is referred to as "operating mode".

The inventors of the present application have prepared three types of operating modes for the legs and configured the power network system so that their operating modes are changed according to the entities to be connected thereto.

The operating modes for the legs include:
a master mode;
a stand-alone mode; and
a designated power transmission/reception mode.
These modes are explained hereinafter one by one.
(Master Mode)

The master mode is an operating mode for a case where the leg is connected to a stable power supply source such as a system and for maintaining the bus voltage $V_{15}$ of the DC bus 15. FIG. 1 shows an example in which the connection terminal 145 of the fourth leg 14 is connected to the core system 1035. In the case of FIG. 1, the fourth leg 14 is operated and controlled in a master mode and is in charge of maintaining the bus voltage $V_{15}$ of the DC bus 15. The other first leg 11 to the third leg 13 are also connected to the DC bus 15. Power may flow into the DC bus 15 from some of first leg 11 to the third leg 13 and power may flow out from some of the first leg 11 to the third leg 13. When power flows out from the DC bus 15 and hence the bus voltage $V_{15}$ of the DC bus 15 is lowered from its rated voltage, the fourth leg 14, which is in the master mode, makes up the deficiency due to the flowed-out power by using power supplied from the connected entity (the core system 1035 in this example). On the other hand, when power flows into the DC bus 15 and hence the bus voltage $V_{15}$ of the DC bus 15 is raised from the rated voltage, the fourth leg 14 makes the excess power due to the flowed-in power flow out to the connected entity (the core system 1035 in this example). In this way, the fourth leg 14, which is in the master mode, maintains the bus voltage $V_{15}$ of the DC bus 15.

Therefore, at least one leg has to be operated in a master mode in one power router. If not, the bus voltage $V_{15}$ of the DC bus 15 cannot be maintained at a fixed voltage. Meanwhile, two or more legs may be simultaneously operated in a master mode in one power router. However, the number of legs operating in a master mode in one power router is preferably one.

Further, the leg in a master mode may be connected to an entity other than the core system, such as a distributed power supply equipped with a self-excited inverter (including a storage battery). However, the leg in a master mode cannot be connected to a distributed power supply equipped with a separately-excited inverter.

In the following explanation, a leg operated in a master mode may be called "master leg".

Operation control of a master leg is explained.
A master leg is activated through the following procedure.
Firstly, the switch 143 is brought into an opened (cut-off) state. The connection terminal 145 is connected to an entity to be connected in this state. In this example, the entity to be connected is the core system 1035.

The voltage of the connected system is measured by the voltage sensor 144, and the amplitude, the frequency, and the phase of the voltage of the connected system are obtained by using a PLL (Phase-Locked-Loop) or the like. After that, the output of the power converting unit 141 is adjusted so that the power converting unit 141 outputs a voltage having amplitude, a frequency, and a phase equal to the obtained ones. That is, On/Off patterns of the transistors Q1 to Q6 are determined. When this output is stabilized, the switch 143 is closed and hence the power converting unit 141 is connected to the core system 1035. At this point, since the voltage of the output of the power converting unit 141 is synchronized with the voltage of the core system 1035, no current flows therebetween.

Operation control for operating a master leg is explained. The bus voltage $V_{15}$ of the DC bus 15 is measured by the voltage sensor 17. If the bus voltage $V_{15}$ of the DC bus 15 is higher than a predetermined rated bus voltage, the power converting unit 141 is controlled so that power is transmitted from the master leg (the fourth leg 14) to the system. (At least one of the amplitude and the phase of the voltage output from the power converting unit 141 is adjusted so that power is transmitted from the DC bus 15 to the core system 1035 through the master leg (the fourth leg 14). Note that the rated voltage of the DC bus 15 is defined in advance by a setting.

On the other hand, if the bus voltage $V_{15}$ of the DC bus 15 is lower than the predetermined rated bus voltage, the power converting unit 141 is controlled so that the master leg (the fourth leg 14) receives power from the core system 1035. (At least one of the amplitude and the phase of the voltage output from the power converting unit 141 is adjusted so that power is transmitted from the core system 1035 to the DC bus 15 through the master leg (the fourth leg 14).) It can be understood that by performing the above-described operation of the master leg, the bus voltage $V_{15}$ of the DC bus 15 can be maintained at the predetermined rated voltage.

(Stand-Alone Mode)

The stand-alone mode is an operating mode in which a leg generates a voltage having amplitude and/or a frequency specified by the management server 1010 by itself and transmits/receives power to/from a connected entity.

For example, it is an operating mode for supplying power for an entity that consumes power such as a load 1031. Alternatively, it is an operating mode for directly receiving power transmitted from a connected entity.

FIG. 1 shows an example in which the connection terminal 125 of the second leg 12 is connected to a load 1031. The second leg 12 is operated and controlled in a stand-alone mode and supplies power to the load 1031.

Further, when the fourth 14 is connected to another power router, the leg may be operated in a stand-alone mode as a mode for transmitting an amount of power required from the another power router.

Alternatively, when the fourth 14 is connected to another power router, the leg may be operated in a stand-alone mode as a mode for receiving power transmitted from the another power router.

Further, though it is not shown in the figure, when the second leg is connected to a generator facility instead of being connected to the load 1031, the second leg can also be operated in a stand-alone mode. However, in this case, the generator facility needs to be equipped with a separately-excited inverter.

An operating mode that is used when power routers are connected with each other will be described later.

A leg that is operated in a stand-alone mode is referred to as "stand-alone leg". One power router may include a plurality of stand-alone legs.

Operation control of a stand-alone leg is explained.
Firstly, the switch 123 is brought into an opened (cut-off) state. The connection terminal 125 is connected to the load 1031. The management server 1010 instructs the power router 101 about the amplitude and the frequency of power (voltage) that should be supplied to the load 1031 Therefore, the control unit 19 performs control so that power (voltage) having the specified amplitude and the frequency is output from the power converting unit 121 to the load 1031. (That is, On/Off patterns of the transistors Q1 to Q6 are determined.) When this output is stabilized, the switch 123 is closed and hence the power converting unit 121 is connected to the load 1031. After that, when power is consumed in the load 1031, power equivalent to that power flows from the stand-alone leg (the second leg 12) to the load 1031.

(Designated Power Transmission/Reception Mode)

The designated power transmission/reception mode is an operating mode for exchanging a designated amount of power. That is, there are a case where a designated amount of power is transmitted to a connected entity and a case where a designated amount of power is received from a connected entity.

When the leg is connected to the leg of other power routers, a determined amount of power may be supplied from one of the power routers to the other power router.

As an alternative example, the third leg 13 is connected to a storage battery 1032.

In the cases like this, a determined amount of power is transmitted to the storage battery 1032 and the storage battery 1032 is thereby charged.

Alternatively, a designated power transmission/reception leg may be connected to a distributed power supply equipped with a self-excited inverter (including a storage battery). However, a designated power transmission/reception leg cannot be connected to a distributed power supply equipped with a separately-excited inverter.

A leg that is operated in a designated power transmission/reception mode is referred to as "designated power transmission/reception leg". One power router may include a plurality of designated power transmission/reception legs.

Operation control of a designated power transmission/reception leg is explained. Control that is performed when the leg is activated is fundamentally the same as that for the master leg, and therefore the explanation thereof is omitted.

Operation control for operating a designated power transmission/reception leg is explained. In FIG. 1, the first leg 11 performs designated power transmission/reception with the first leg 21 of the power router 102 operated in the stand-alone mode through the transmission line 1200. In the first leg 11 of the power router 101, the voltage of the connected system is measured by the voltage sensor 114, and the frequency and/or the phase of the voltage of the connected system are obtained by using a PLL (Phase-Locked-Loop) or the like. A target value for a current input/output by the power converting unit 111 is obtained (or calculated) based on an active power value and a reactive power value specified by the management server 1010 and the frequency and the phase of the voltage of the connected entity. The present value (i.e., value at the present time) of the current is measured by the current sensor 112. The power converting unit 111 is adjusted so that a current corresponding to a difference between the target value and the present value is additionally output. (At least one of the amplitude and the phase of the voltage output from the power converting unit 111 is adjusted so that desired power flows between the designated power transmission/reception leg and the connected entity.)

From the above explanation, it can be understood that each of the first leg 11 to the fourth keg 14 having identical configurations can perform three different functions by changing the way of the operation control thereof.

The power router 101 can cause each leg to operate in the three operation modes described above by referring to the operation mode designation information included in the control instruction 51. Thus, the power router 101 can appropriately operate each leg according to a role thereof.

Next, connection restriction among the power routers will be described. Since the function of a leg is changed based on its operating mode, a restriction(s) occurs between the choice of a connected entity and the choice of an operating mode as a matter of course. In other words, when the entity to be connected is determined, an operating mode(s) that the leg can select is determined. To put it the other way around, when the operating mode is determined, selectable entities to be connected are determined. (When the connected entity is changed, the operating mode of the leg needs to be changed according to the new connected entity.)

Possible connection combination patterns are explained.

Figure 6:
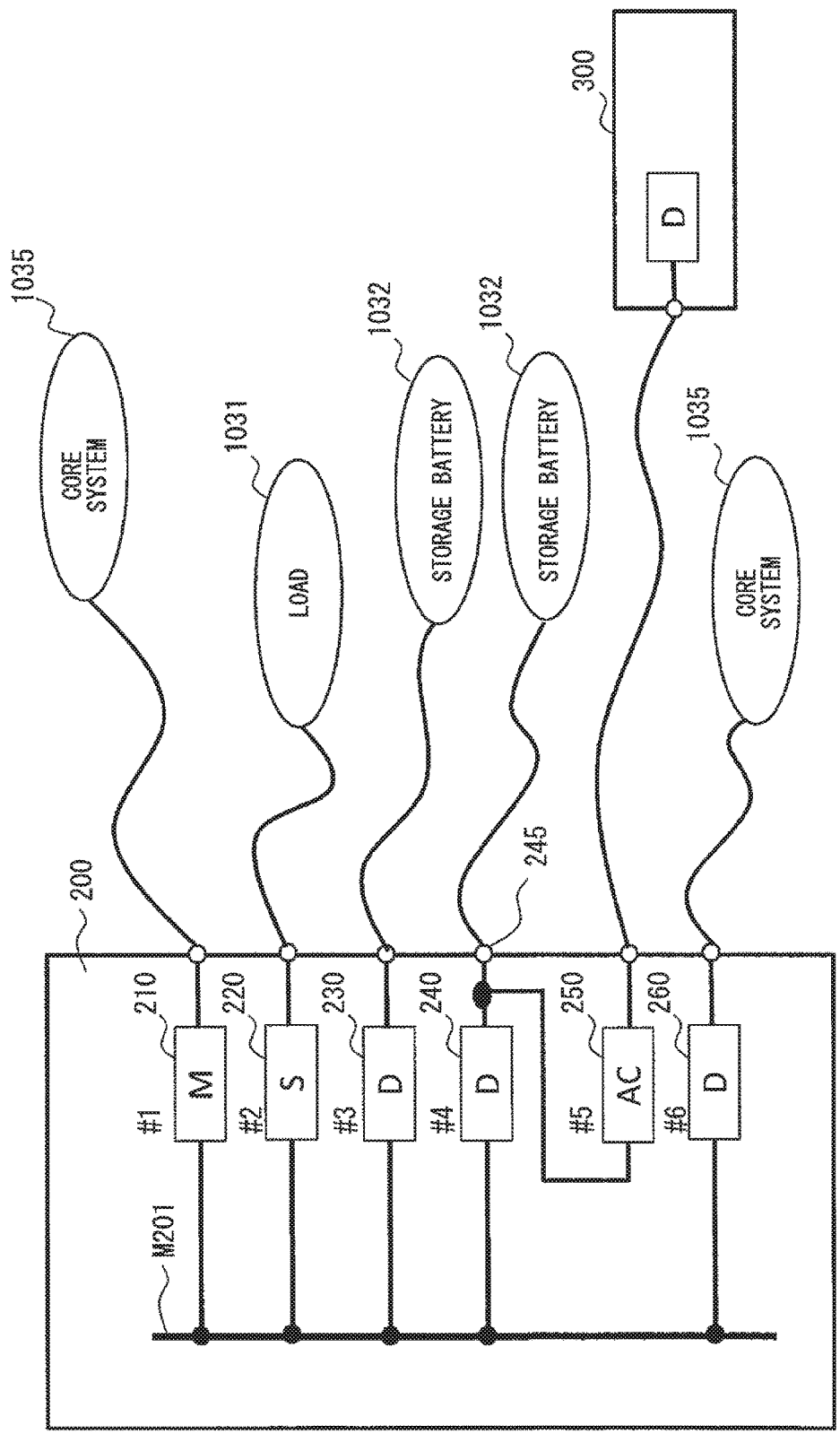
FIG. 6 is a diagram showing one example in which the power router is connected to a core system, a load, and various distributed power supplies.

In the following explanation, expressions in the figures are simplified as shown in FIG. 6.

That is, a master leg is represented by "M".

A stand-alone leg is represented by "S".

A designated power transmission/reception leg is represented by "D".

An AC through leg is represented by "AC".

Further, when necessary, legs may be distinguished from one another by adding numbers such as "#1" at the upper-left corners of legs.

Further, in FIGS. 6 to 12 and the subsequent figures, symbols are assigned in an orderly manner in each figure. However, the same symbols are not necessarily assigned to the same components throughout the figures.

For example, a symbol 200 in FIG. 6 does not necessarily represent the same component as the component assigned with a symbol 200 in FIG. 4A.

The connection combinations shown in FIG. 6 are all possible connections. A first leg 210 is connected to a core system 1035 as a master leg. This is already explained above.

A second leg 220 is connected to a load 1031 as a stand-alone leg. This is also already explained above.

A third leg 230 and a fourth leg 240 are connected to a storage battery 1032 as designated power transmission/reception legs. This is also already explained above.

A fifth leg 250 is an AC through leg. The AC through leg 250 is connected to a designated power transmission/reception leg of another power router 300 and the AC through leg 250 is connected to the storage battery 1032 through a connection terminal 245 of the fourth leg 240. Since the AC through leg 250 does not employ a power converting unit, the relation of connection is equivalent to that the designated power transmission/reception leg of other power router 300 is directly connected to the storage battery 1032. It can be understood that this connection can be allowed.

A sixth leg 260 is connected to the core system 1035 as a designated power transmission/reception leg. Assuming that a determined amount of power is received from the core system 1035 through the sixth leg 260, it can be understood that this connection can be allowed.

Note that since the first leg 210 serves as the master leg, the master leg 210 receives necessary power from the core system 1035 when the power received through the sixth leg 260 is not sufficient for maintaining the rated voltage of a DC bus M201. On the other hand, when the power received through the sixth leg 260 exceeds the amount of power necessary for maintaining the rated voltage of the DC bus M201, the master leg 210 makes the excess power flow out to the core system 1035.

Next, a case where power routers are connected with each other is explained. Connecting power routers with each other means that a leg of one power router is connected to a leg of another power router. When legs are connected to each other, there is a restriction on operating modes that can be combined with each other.

Figure 7A:
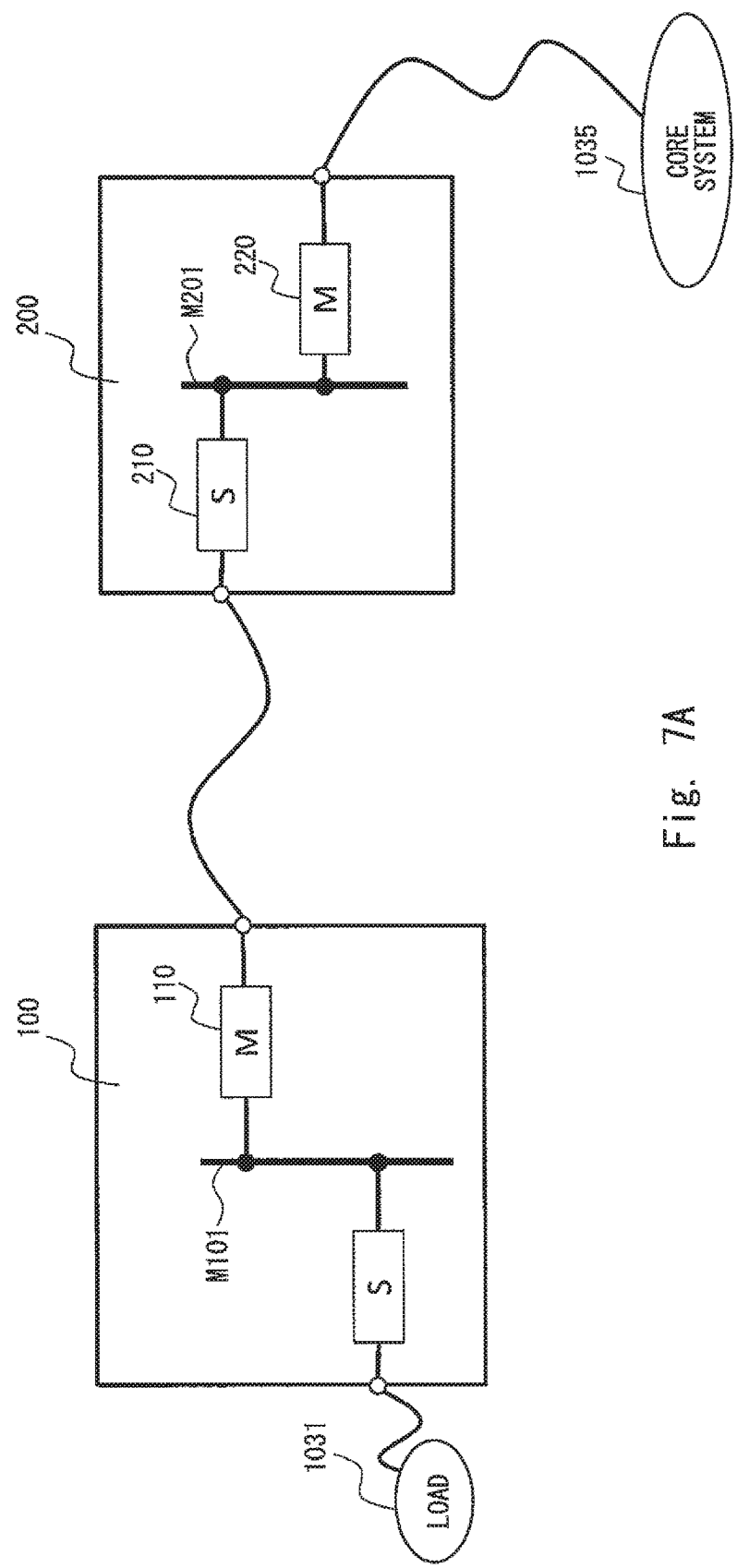
FIG. 7A is a diagram showing an example of a combination of power routers whose connection is permitted.
Figure 7B:
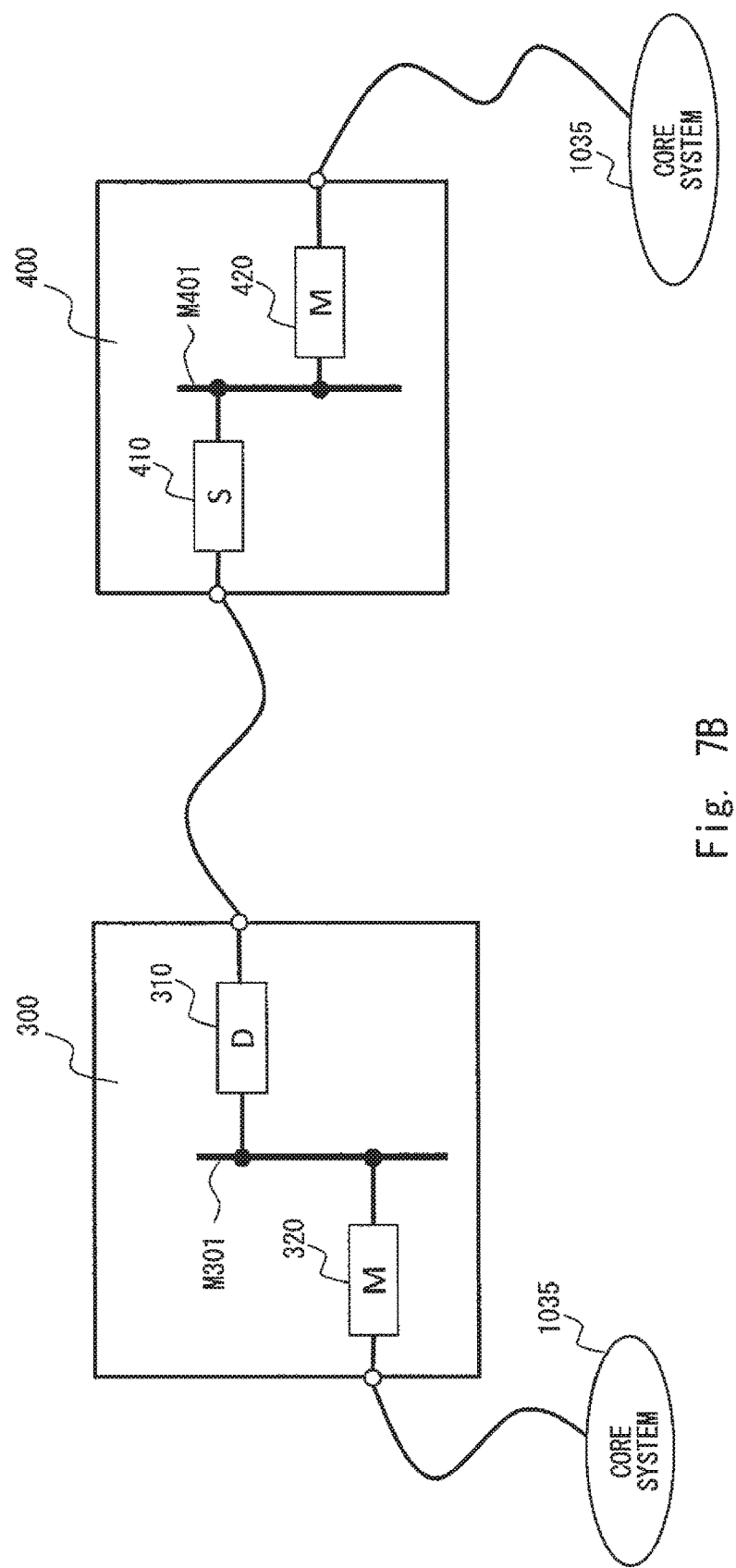
FIG. 7B is a diagram showing an example of a combination of power routers whose connection is permitted.

Both of FIGS. 7A and 7B show examples of possible combinations. In FIG. 7A, a master leg 110 of a first power router 100 is connected to a stand-alone leg 210 of a second power router 200. Though detailed explanations are omitted, it is assumed that a master leg 220 of the second power router 200 is connected to a core system 1035 and the voltage of a DC bus M201 of the second power router 200 is thereby maintained at the rated voltage.

In FIG. 7A, when power is supplied from the power router 100 to a load 1031, the voltage of a DC bus M101 is lowered. The master leg 110 obtains power from the connected entity in order to maintain the voltage of the DC bus M101. That is, the master leg 110 draws power equivalent to the shortage from the stand-alone leg 210 of the second power router 200. The stand-alone leg 210 of the second power router 200 sends the amount of power required by the connected entity (the master leg 110 in this example). The voltage of the DC bus M201 of the second power router 200 is lowered by an amount corresponding to the power that has been sent out from the stand-alone leg 210. However, this deficiency is made up by the master leg 220 by using power from the core system 1035. In this way, the power router 100 can receive a necessary amount of power from the second power router 200.

As described above, even when the master leg 110 of the power router 100 is connected to the stand-alone leg 210 of the second power router 200, any failure occurs in neither of their operations because the role of the master leg 110 is consistent with that of the stand-alone leg 210. Therefore, it can be understood that a master leg can be connected to a stand-alone leg as shown in FIG. 7A.

In FIG. 7B, a designated power transmission/reception leg 310 of a third power router 300 is connected to a stand-alone leg 410 of a fourth power router 400. Though detailed explanations are omitted, it is assumed that a master leg 320 of the third power router 300 and a master leg 420 of the fourth power router 400 are both connected to a core system 1035 and the voltages of DC buses M301 and M401 of the third and fourth power routers 300 and 400, respectively, are thereby maintained at their rated voltages.

It is assumed that the designated power transmission/reception leg 310 of the third power router 300 is instructed to receive a designated amount of power under an instruction of the management server 1010. The designated power transmission/reception leg 310 draws the designated amount of power from the stand-alone leg 410 of the fourth power router 400. The stand-alone leg 410 of the fourth power router 400 sends the amount of power required by the connected entity (the designated power transmission/reception leg 310 in this example). Although the voltage of the DC bus M401 of the fourth power router 400 is lowered by an amount corresponding to the power sent out from the stand-alone leg 410, this deficiency is made up by the master leg 420 by using power from the core system 1035.

As described above, even when the designated power transmission/reception leg 310 of the third power router 300 is connected to the stand-alone leg 410 of the second power router 400, any failure occurs in neither of their operations because the role of the designated power transmission/reception leg 310 is consistent with that of the stand-alone leg 410. Therefore, it can be understood that a designated power transmission/reception leg can be connected to a stand-alone leg as shown in FIG. 7B.

Note that although an example where the third power router 300 receives power from the fourth power router 400 is explained, it can be understood that even when the third power router 300 supplies power to the fourth power router 400 in contrast to the above-described example, any failure occurs in neither of their operations as in the case of the above-described example.

In this way, a designated amount of power can be interchanged between the third and fourth power routers 300 and 400.

When legs having power converting units are directly connected to each other, only the two patterns shown in FIGS. 7A and 7B are allowed.

That is, only the case where a master leg is connected to a stand-alone leg and the case where a designated power transmission/reception leg is connected to a stand-alone leg are allowed.

Next, combinations of legs that cannot be connected to each other are shown.

FIGS. 8A to 8D show patterns of legs that cannot be connected to each other.

Figure 8A:
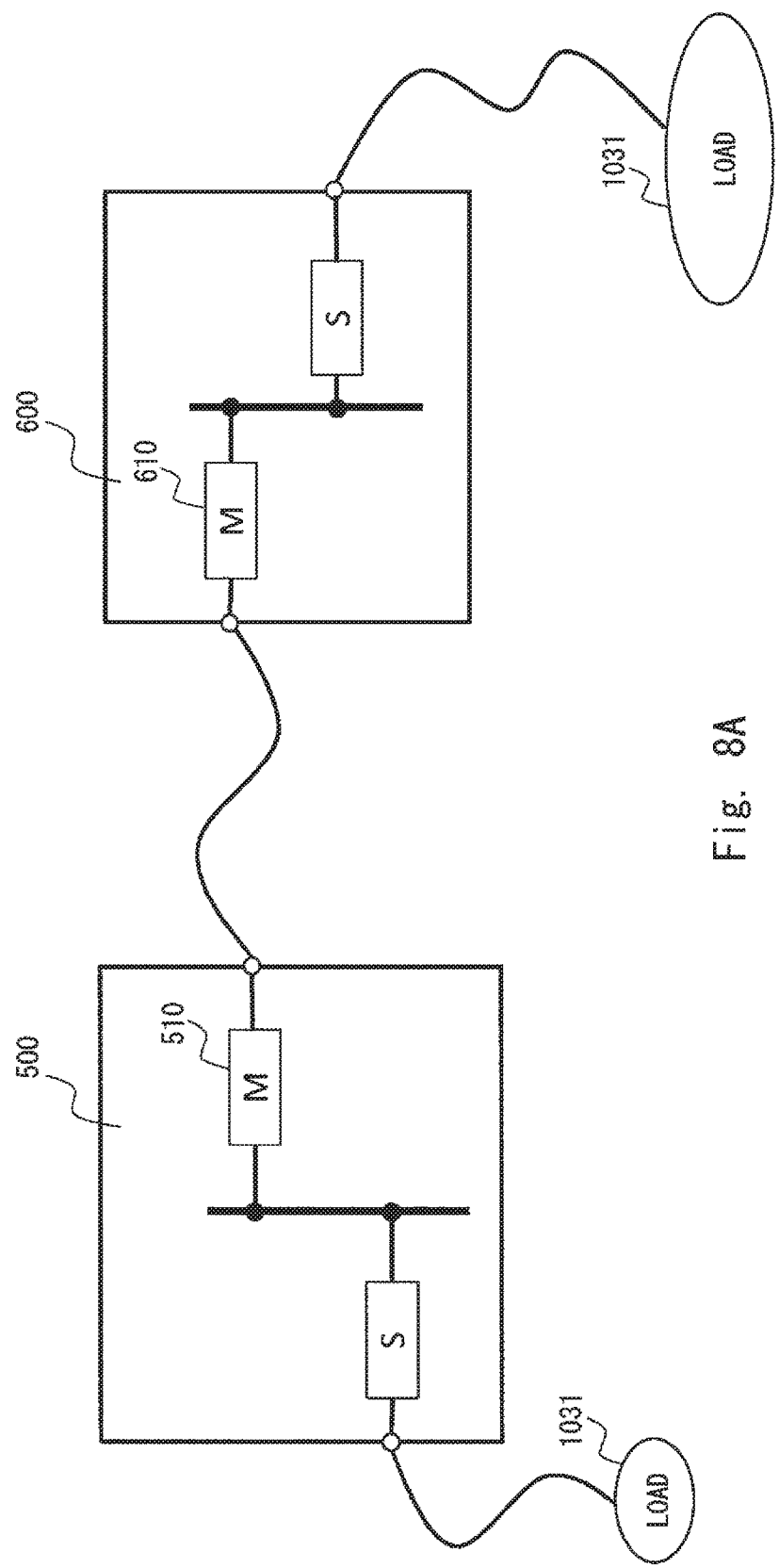
FIG. 8A is a diagram showing an example of a combination of power routers whose connection is prohibited.
Figure 8B:
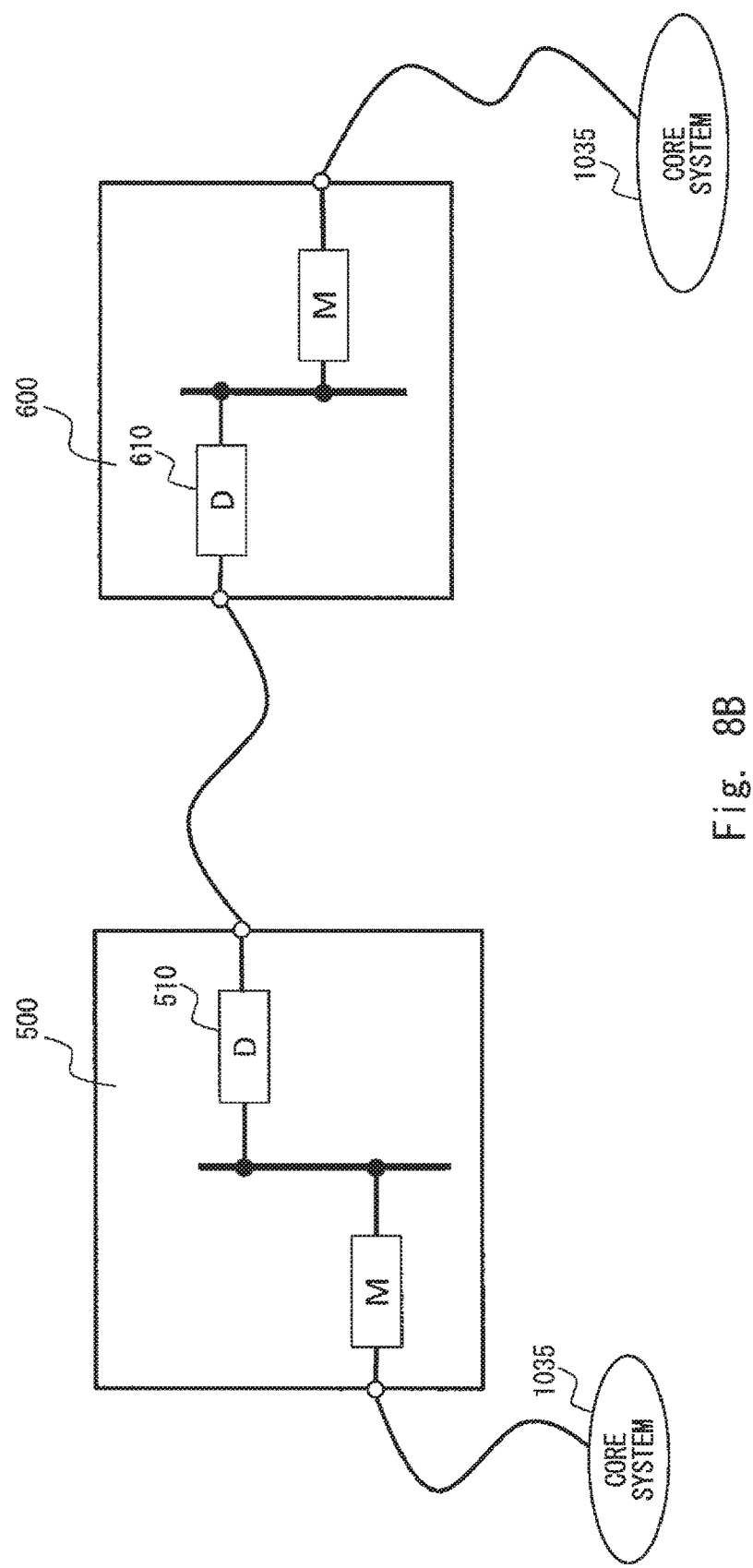
FIG. 8B is a diagram showing an example of a combination of power routers whose connection is prohibited.
Figure 8C:
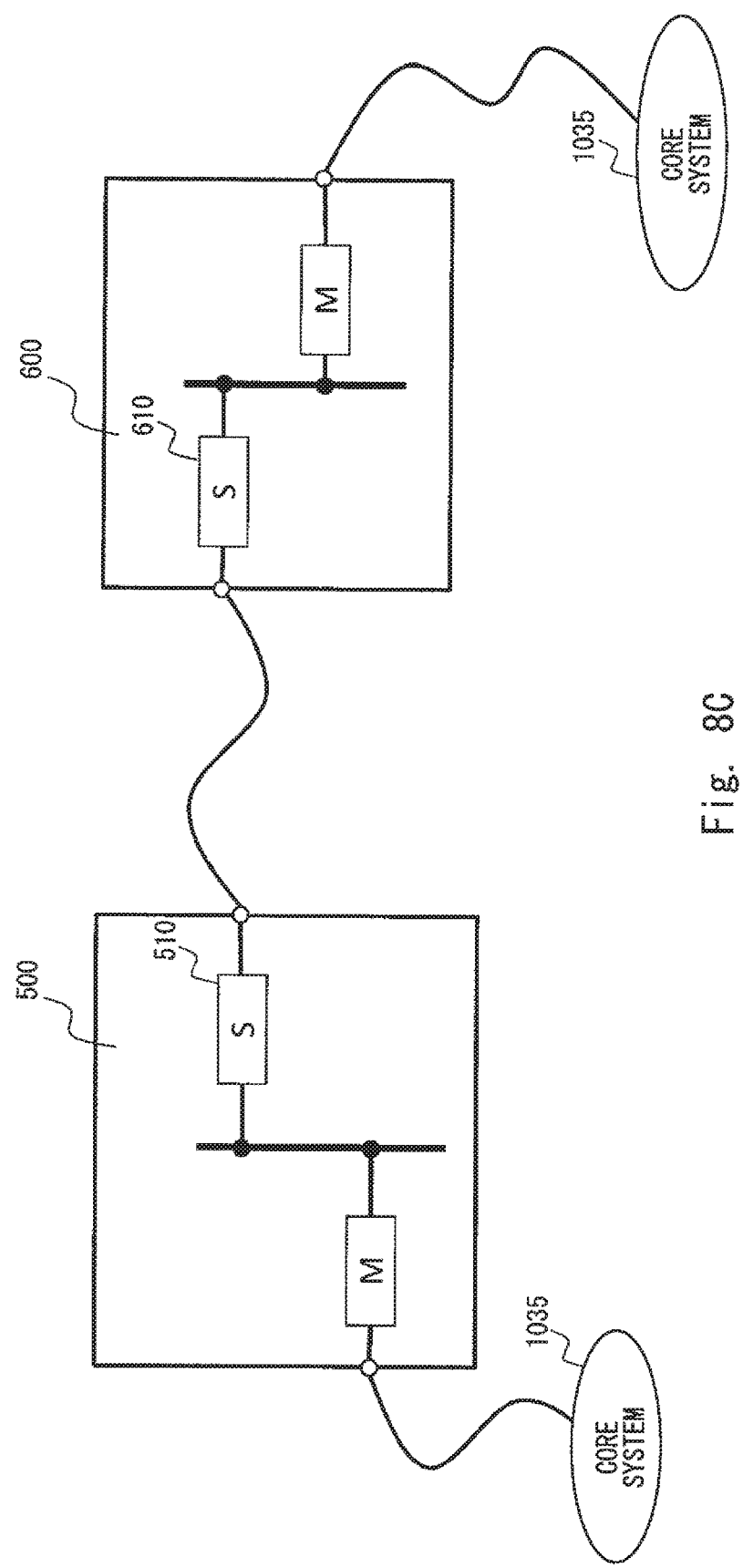
FIG. 8C is a diagram showing an example of a combination of power routers whose connection is prohibited.

As can be seen from FIGS. 8A, 8B and 8C, legs in the same operating modes cannot be connected to each other.

In the case of FIG. 8A, for example, master legs are connected to each other.

As explained previously in the explanation of the operations, a master leg first performs a process of generating power whose voltage, frequency, and phase are synchronized with those of an entity to be connected thereto.

If the entity to be connected is also a master leg, they try to synchronize their voltages and frequencies with each other. However, since the master legs do not independently establish the voltages and the frequencies, these synchronization processes cannot succeed.

Therefore, master legs cannot be connected to each other.

In addition, there is the following reason.

A master leg has to draw power from a connected entity in order to maintain the voltage of its DC bus. (Alternatively, a master leg has to make excess power flow out to a connected entity in order to maintain the voltage of its DC bus.) If master legs are connected to each other, each of them cannot meet the requirement of the other connected entity. (If master legs are connected to each other, both of the power routers cannot maintain the voltages of their DC buses. As a result, a failure such as a power failure (or blackout) could occur in each of their power cells.) Since the roles of master legs contradict each other (are inconsistent with each other) as described above, master legs cannot be connected to each other.

In FIG. 8B, designated power transmission/reception legs are connected to each other. It can be understood that this connection also does not work properly.

As in the case of the master legs and as explained previously in the explanation of the operations, a designated power transmission/reception leg first performs a process of generating power whose voltage, frequency, and phase are synchronized with those of an entity to be connected thereto.

If the entity to be connected is also a designated power transmission/reception leg, they try to synchronize their voltages and frequencies with each other. However, since the designated power transmission/reception legs do not independently establish the voltages and the frequencies, these synchronization processes cannot succeed.

Therefore, designated power transmission/reception legs cannot be connected to each other.

In addition, there is the following reason.

Even if designated power to be transmitted that one of the designated power transmission/reception legs, e.g., the designated power transmission/reception leg 510 should transmit is conformed to designated power to be received that the other designated power transmission/reception leg 610 should receive, these designated power transmission/reception legs cannot be connected to each other. For example, assume that the one designated power transmission/reception leg 510 tries to adjust its power converting unit in order to transmit the designated power to be transmitted. (For example, it makes its output voltage higher than that of the connected entity by a predetermined amount.) Meanwhile, the other designated power transmission/reception leg 610 tries to adjust its power converting unit in order to receive the designated power to be received. (For example, it makes its output voltage lower than that of the connected entity by a predetermined amount.) It can be understood that if the above-described adjustment operations are simultaneously performed in both of the designated power transmission/reception legs 510 and 610, both of them go out of control.

In FIG. 8C, stand-alone legs are connected to each other. This connection is also prohibited.

A stand-alone leg generates a voltage and/or a frequency by itself.

If stand-alone legs are connected to each other and one of the voltages, the frequencies, and the phases generated by the two stand-alone legs are separated from each other even by a small amount, unintended power flows between these two stand-alone legs.

Since it is practically impossible to continuously conform the voltages, the frequencies, and the phases generated by the two stand-alone legs to each other, stand-alone legs cannot be connected to each other.

Figure 8D:
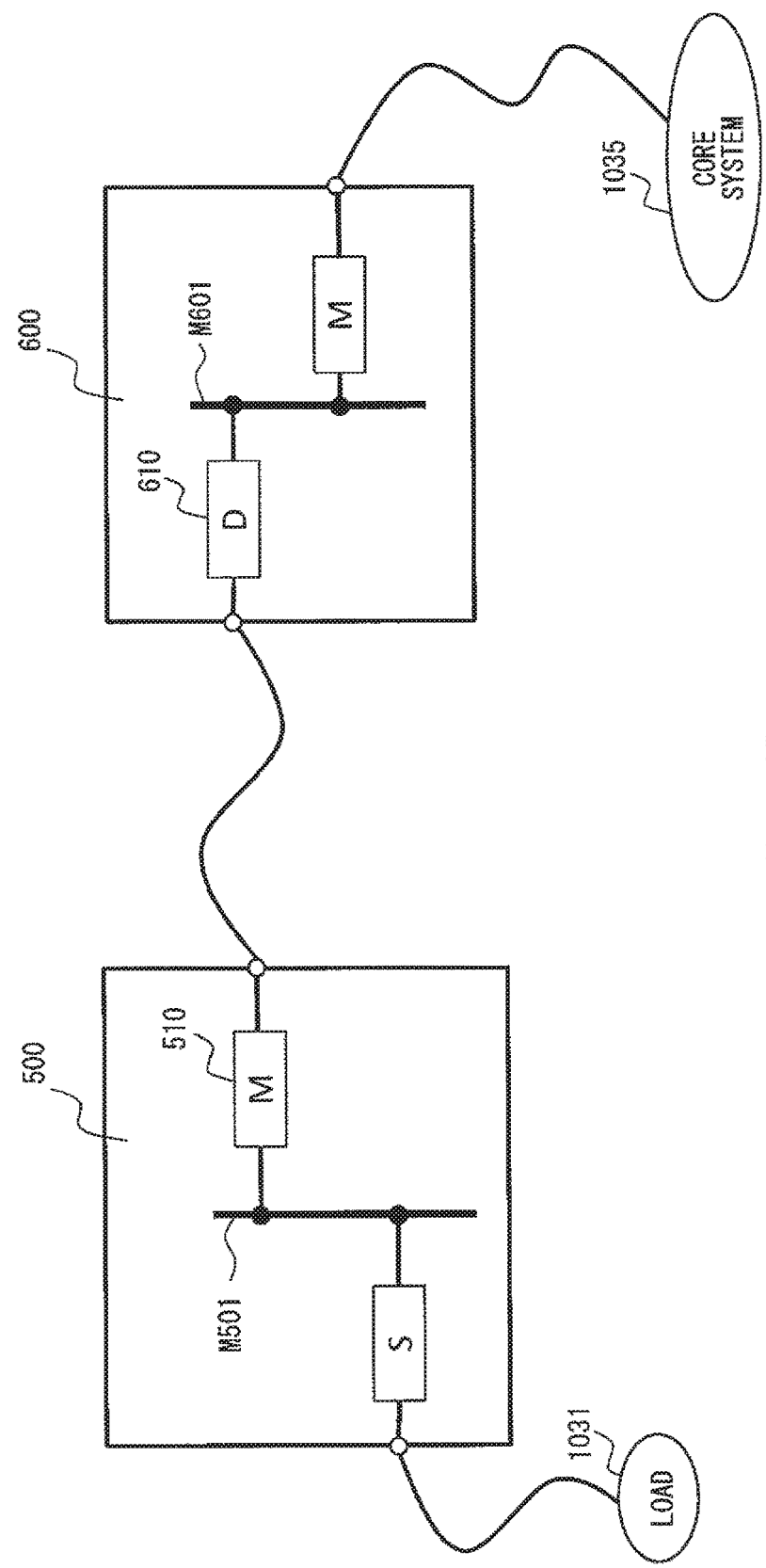
FIG. 8D is a diagram showing an example of a combination of power routers whose connection is prohibited.

In FIG. 8D, a master leg is connected to a designated power transmission/reception leg.

It can be understood that this connection also does not work properly based on the above explanations. Even if the master leg 510 tries to transmit/receive power to/from the connected entity in order to maintain the voltage of a DC bus M501, the designated power transmission/reception leg 610 does not transmit/receive power to/from the master leg 510 according to the request from the master leg 510. Therefore, the master leg 510 cannot maintain the voltage of the DC bus M501. Further, even if the designated power transmission/reception leg 610 tries to transmit/receive a designated amount of power to/from the connected entity (510), the master leg 510 does not transmit/receive power to/from the designated power transmission/reception leg 610 according to the request from the designated power transmission/reception leg 610. Therefore, the designated power transmission/reception leg 610 cannot transmit/receive the designated amount of power to/from the connected entity (the master leg 510 in this example).

Figure 9A:
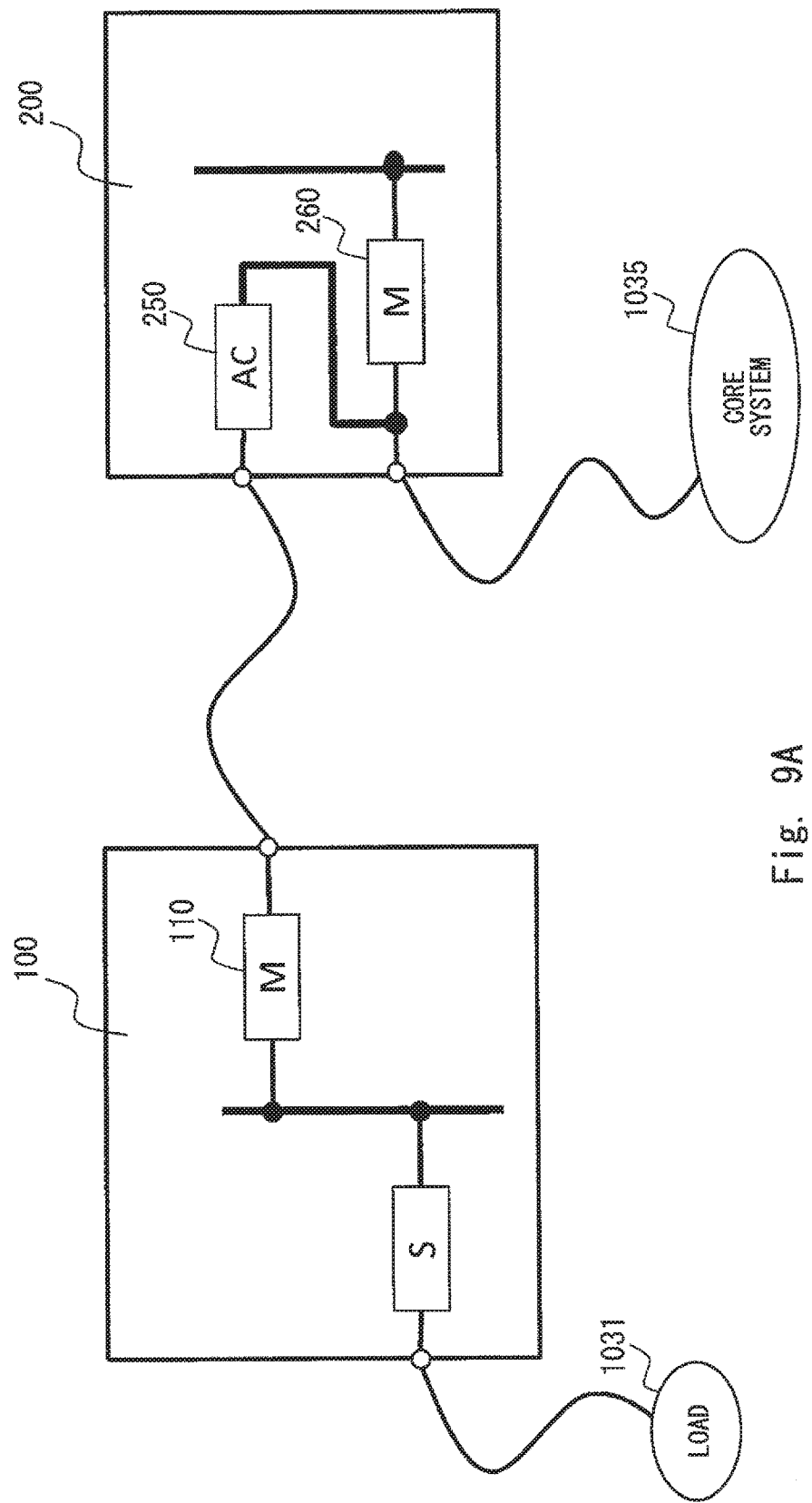
FIG. 9A is a diagram showing an example of a combination of power routers whose connection is permitted when an AC-through leg is taken into consideration.
Figure 9B:
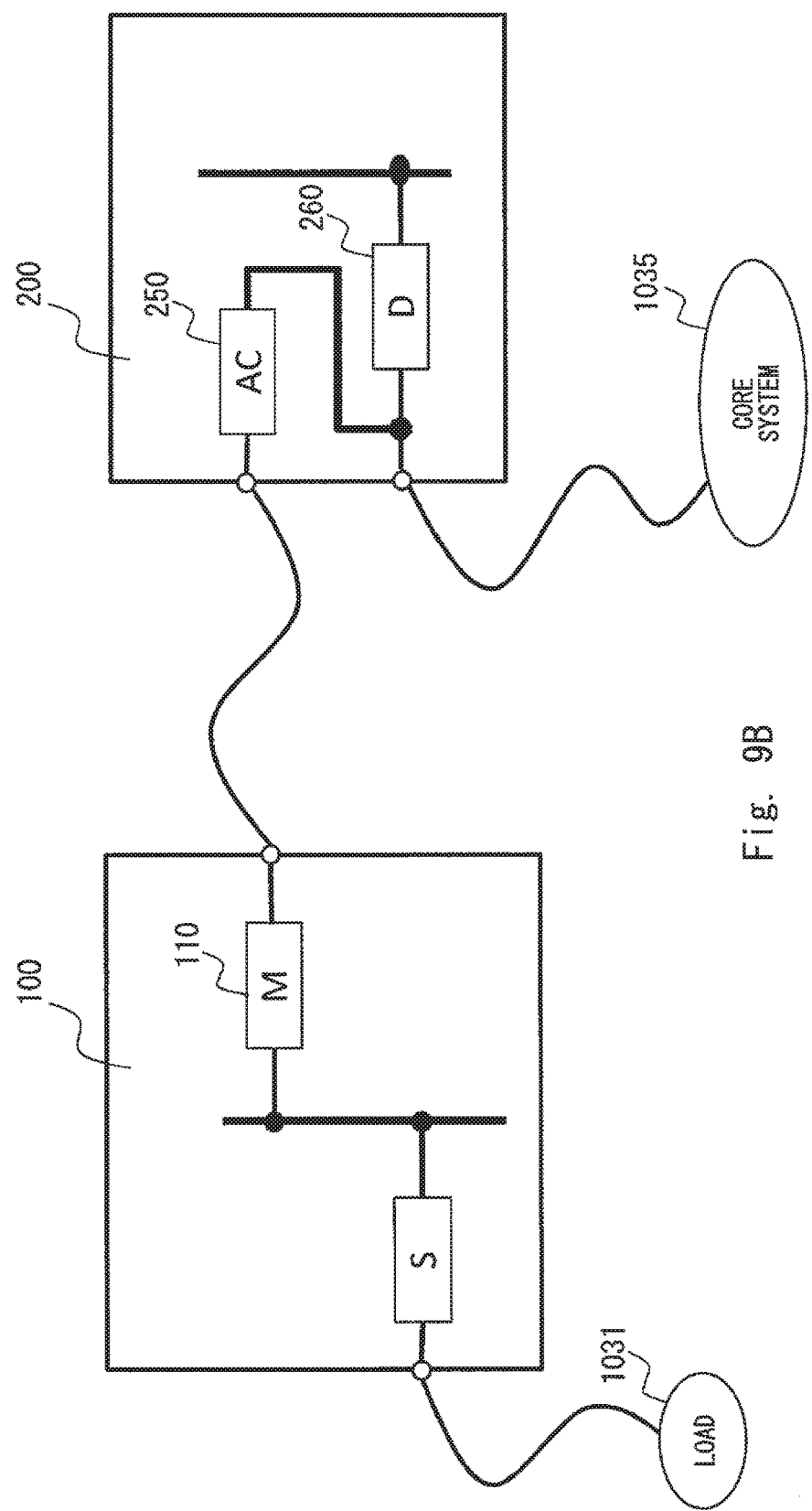
FIG. 9B is a diagram showing an example of a combination of power routers whose connection is permitted when an AC-through leg is taken into consideration.
Figure 9D:
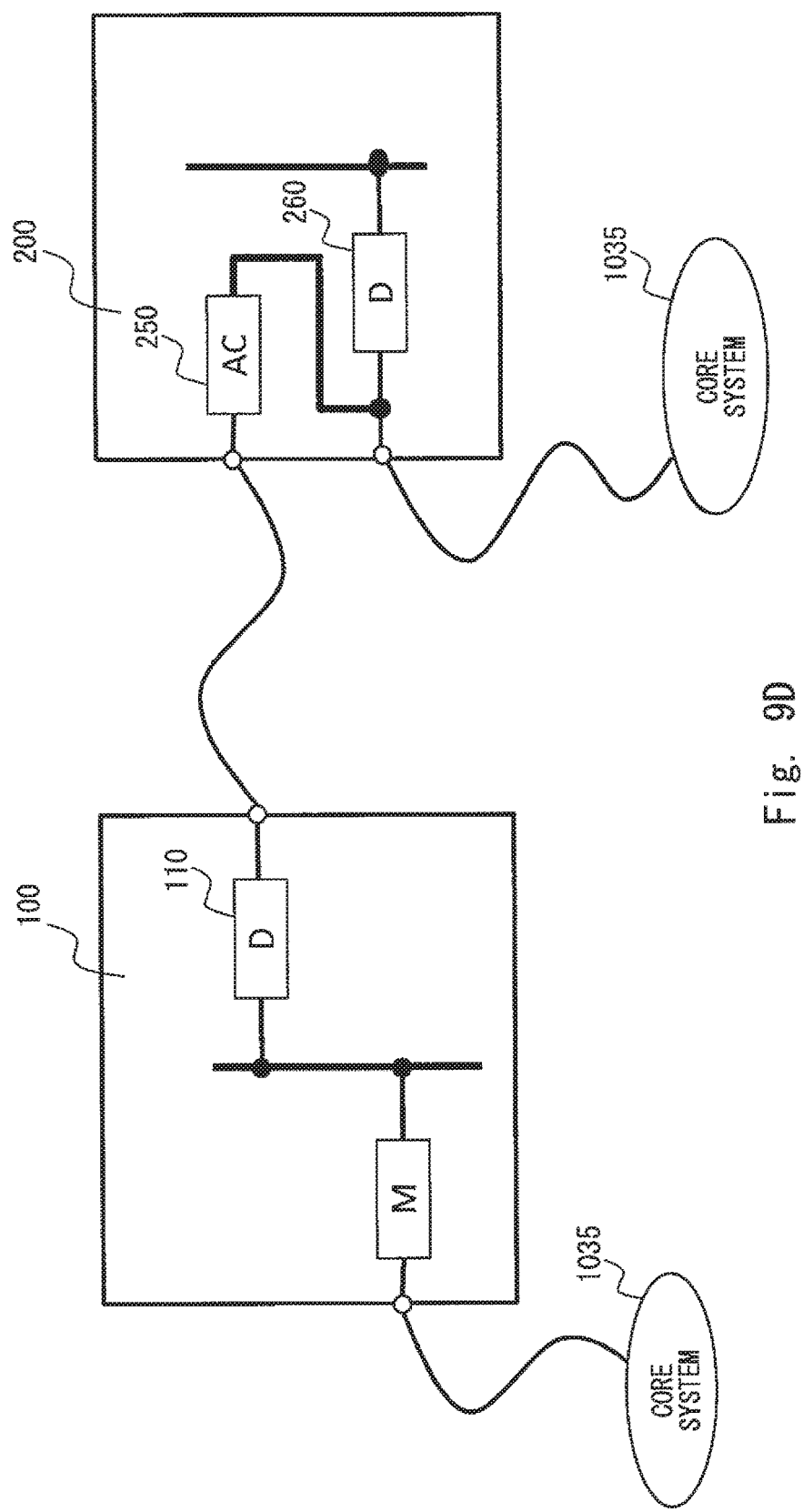
FIG. 9D is a diagram showing an example of a combination of power routers whose connection is permitted when an AC-through leg is taken into consideration.

The case in which the legs including power converting units are connected has been stated above. When an AC-through leg is taken into consideration, patterns shown in FIGS. 9A to 9D are also available. Since the AC-through leg does not include a power converting unit, it is a simple bypass. Accordingly, as shown in FIGS. 9A and 9B, the situation in which the master leg 110 of the first power router 100 is connected to the core system 1035 through the AC-through leg 250 of the second power router 200 is substantially equal to the situation in which the master leg 110 is directly connected to the core system 1035. In a similar way, as shown in FIGS. 9C and 9D, the situation in which the designated power transmission/reception leg 110 of the first power router 100 is connected to the core system 1035 through the AC through leg 250 of the second power router 200 is substantially equal to the situation in which the designated power transmission/reception leg 110 is directly connected to the core system 1035.

Figure 10:
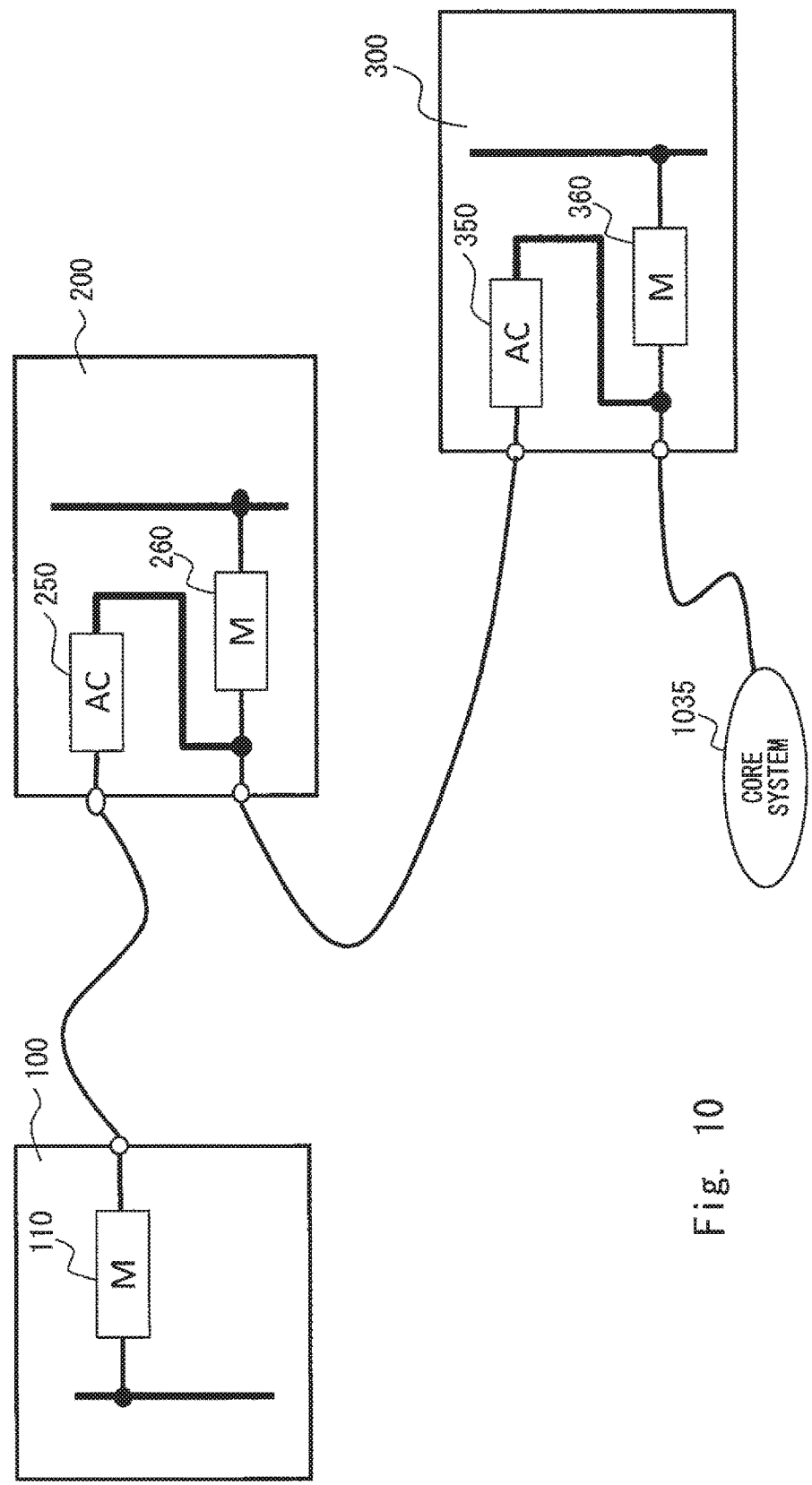
FIG. 10 is a diagram showing an example where a path between a first power router 100 and a core system is long.

Still, it is convenient to provide the AC-through leg. There may be a case, for example, in which the distance from the first power router 100 to the core system 1035 is extremely long and some power routers 200 and 300 need to be passed to connect the first power router 100 to the core system 1035, as shown in FIG. 10. If it is assumed that the AC-through leg is not provided, as shown in FIG. 7A, one or a plurality of stand-alone legs need to be passed. When a leg including a power converting unit is passed, it requires conversion from AC power into DC power and conversion from DC power into AC power. The power conversion causes an energy loss, though the loss is low (several %). It is inefficient to require a power conversion a plurality of times only to connect the power router to the utility grid. It is therefore preferable that the AC-through leg which does not include a power converting unit is provided in the power router.

Figure 12:
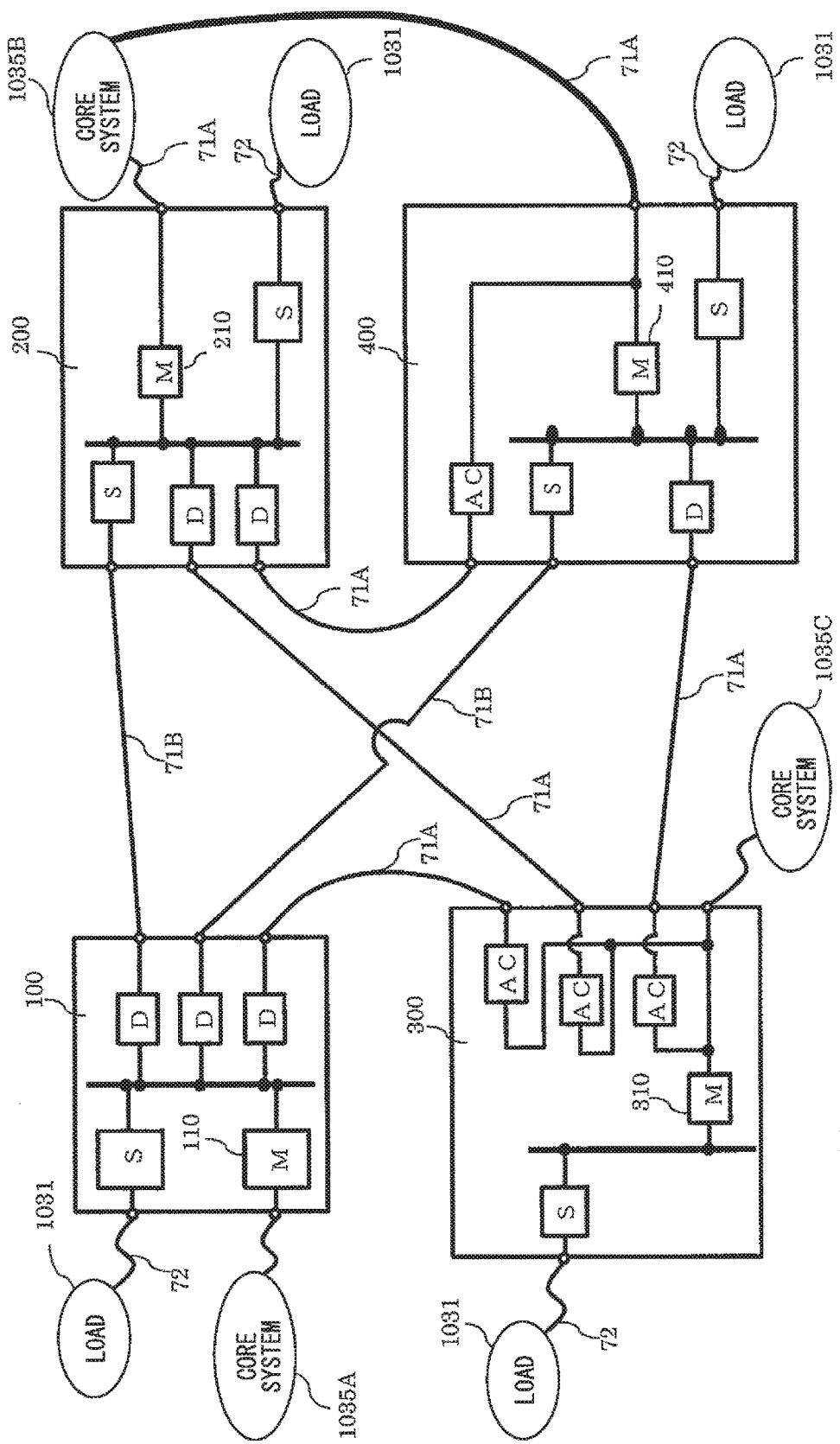
FIG. 12 is a diagram of one example of a case in which four power routers are interconnected.

FIG. 11 shows the combination of connections described above. FIG. 12 shows one example in which the four power routers 100, 200, 300 and 400 are interconnected. In FIG. 12, the power-transmission line which is a part of the core system is denoted by the symbol 71A and the power-transmission line separated from the utility grid is denoted by the symbol 71B. Further, when the connection line that connects the power router and the load (or the distributed power supply) is called a distribution line 72, the distribution line 72 is separated from the core system 1035. In summary, the distribution line 72 that connects the power router and the load (or distributed power supply) is not connected to the core system 1035. Furthermore, symbols 1035A to 1035C indicate core systems. Since any relations of connection are appeared in the above description, each destination thereof is not described in detail. It can be understood that any relations of connection can be allowed.

Next, the power router 102 will be described with referring back to FIG. 1. The power router 102 roughly includes a direct current (DC) bus 15, a communication bus 16, a first leg 21, a second leg 22, a third leg 23, a fourth leg 24 and a control unit 19. In addition, in FIG. 1, the first leg to the fourth leg are indicated as a leg 1 to a leg 4, respectively, for convenience of the drawings. The first leg 21, the second leg 22, the third leg 23 and the fourth leg 24 have the same configurations as the first leg 11, the second leg 12, the third leg 13 and the fourth leg 14 of the power router 101, respectively. The first leg 21, the second leg 22, the third leg 23 and the fourth leg 24 are connected to the outside through terminals 215, 225, 235 and 245, respectively. The operation modes of the power router 102 are the same as those of the power router 101 and, thereby, the description thereof will be omitted.

In this embodiment, the first leg 11 of the power router 101 and the first leg 21 of the power router 102 are connected to each other through the transmission line 1200. The second leg 22 is connected to a load 1033 through the terminal 225. The third leg 23 is connected to a storage battery 1034 through the terminal 235. The fourth leg 24 is connected to the core system 1035 through the terminal 245. Therefore, the fourth leg 24 operates as a master leg.

Figure 13:
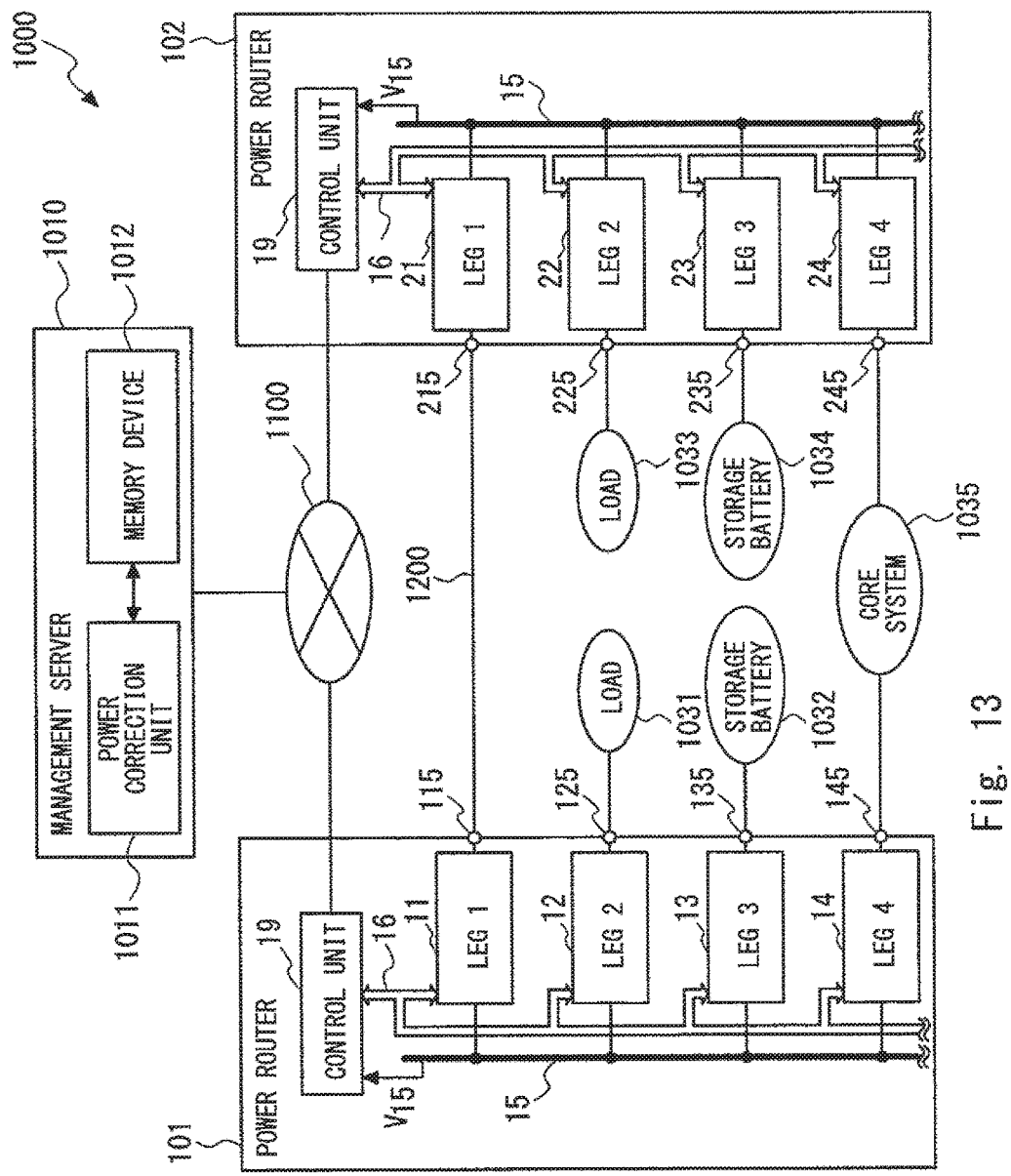
FIG. 13 is a block diagram illustrating a schematic configuration of the power network system 1000 when a configuration of the management server 1010 is illustrated.

Next, the management server 1010 will be described. FIG. 13 is a block diagram illustrating a schematic configuration of the power network system 1000 when a configuration of the management server 1010 is illustrated. The management server 1010 can be configured as hardware such as a computer, for example. The management server 1010 includes a power correction unit 1011 and a memory device 1012. The power correction unit 1011 performs an operation necessary for controlling the power when the power is transmitted from a designated power transmission/reception leg to a stand-alone leg as described below. The memory device 1012 stores information, which is necessary for controlling the power when the power is transmitted from the designated power transmission/reception leg to the stand-alone leg as described below, therein. Note that the power correction unit is referred as a power correction measure.

Figure 14:
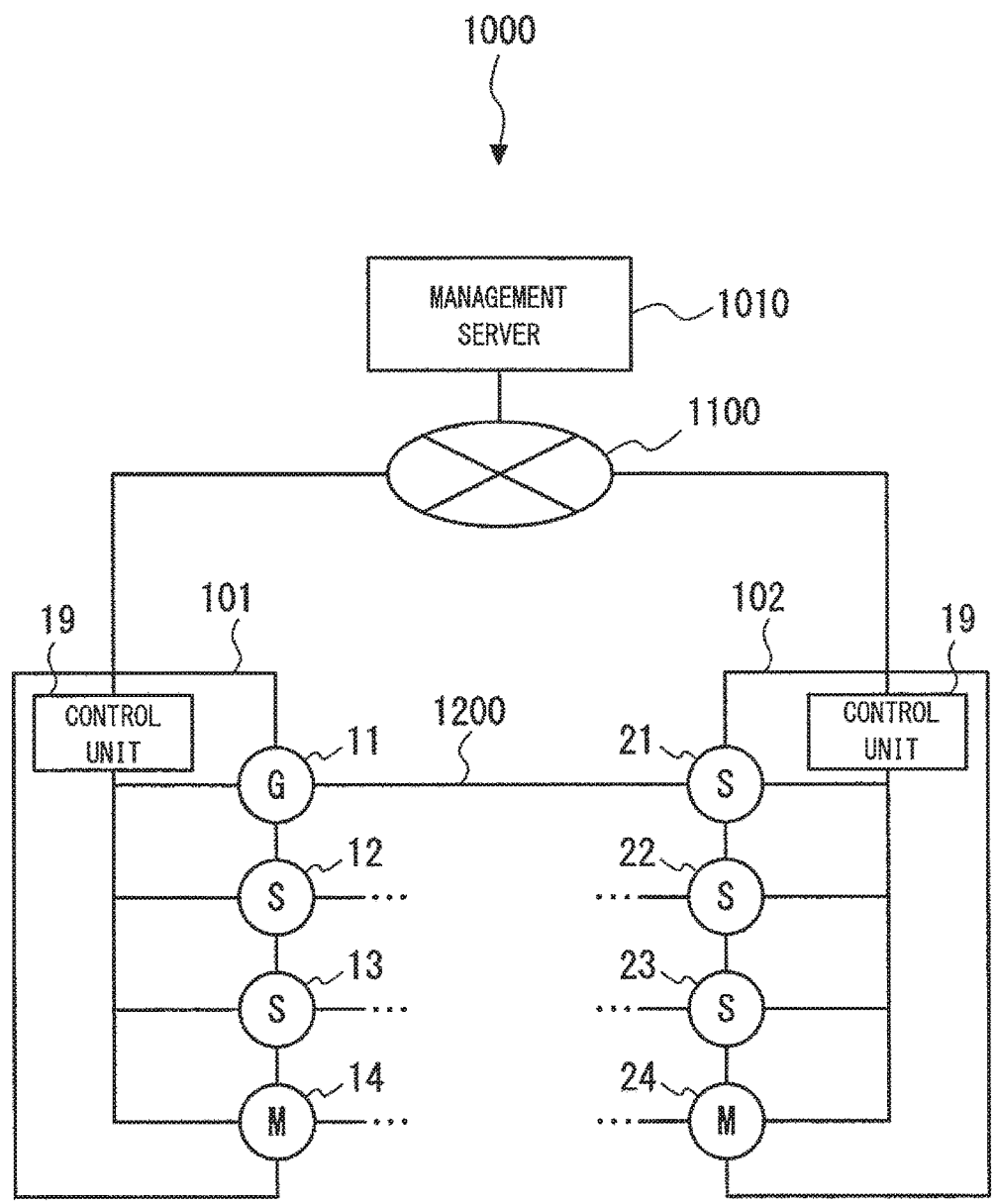
FIG. 14 is a block diagram schematically illustrating a configuration of the power network system 1000 when the power is transmitted from a designated power transmission/reception leg to a stand-alone leg.

Next, the power control in a case of the power transmission from a designated power transmission/reception leg to another power transmission/reception leg will be described. When the power is transmitted from a designated power transmission/reception leg of one power router to another power router, a stand-alone leg is assigned to a reception-side leg. FIG. 14 is a block diagram schematically illustrating a configuration of the power network system 1000 when the power from the designated power transmission/reception leg to the other power transmission/reception leg. In FIG. 14, the legs are represented by circles and signs are illustrated in the circles to indicate the operation mode of the leg. The sings indicating the operation modes are as follows: the master mode is "M"; the designated transmission/reception mode leg is "G"; and the stand alone mode is "S".

Here, in the power router 101, the first leg 11 is the designated transmission/reception leg, the second leg 12 and the third leg 13 are the stand-alone legs, and the fourth leg 14 is the master leg. In the power leg 102, the first leg 21, the second leg 22 and the third leg 23 is the stand-alone legs, and the fourth leg 24 is the master leg.

Hereinafter, for convenience, the first leg 11 is also referred to as a designated power transmission/reception leg 11 and the first leg 21 is also referred to as a stand-alone leg 21. In the present embodiment, a power control in a case that the power is transmitted from the designated power transmission/reception leg 11 to the stand-alone leg 21 is described.

Figure 15:
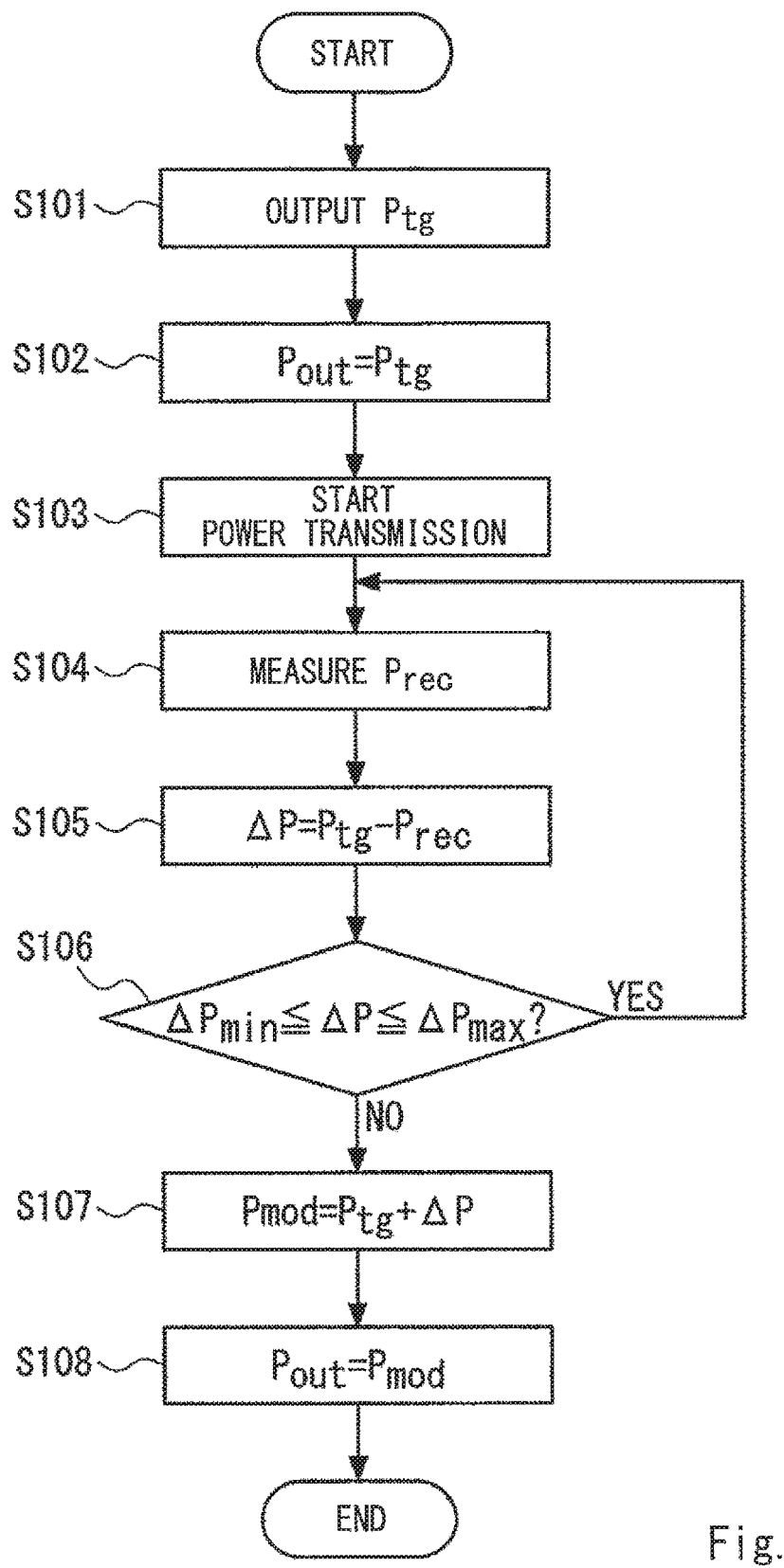
FIG. 15 is a flowchart showing a power control when the power is transmitted from a designated power transmission/reception leg 11 to a stand-alone leg 21.

FIG. 15 is a flowchart showing the power control when the power is transmitted from the designated power transmission/reception leg 11 to the stand-alone leg 21.

Step S101: Output of Target Power Value $P_{tg}$

The management server 1010 reads out a target power value $P_{tg}$ (a first setting power) and outputs the read-out value to the power router 101. Here, the target power value $P_{tg}$ is a target value of power which the designated power transmission/reception leg 11 should transmit to the stand-alone leg 21. The target power value $P_{tg}$ is stored in the control instruction database 196 of the control unit 19 of the power router 101.

Step S102: Setting of the Target Power Value $P_{Tg}$

The control unit 19 of the power router 101 sets the target power value $P_{tg}$ as an initial value of output power $P_{out}$ of the designated power transmission/reception leg 11 ($P_{out}=P_{tg}$).

Step S103: Start of Transmission

The control unit 19 of the power router 101 causes the designated power transmission/reception leg 11 to start the power transmission to the stand-alone leg 21 at the output power $P_{out}$. As described above, the control unit 19 of the power router 101 controls the power converting unit 111 of the designated power transmission/reception leg 11 of the power router 101 and, therefore, the power transmission starts.

Step S104: Measurement of Power Reception Performance Value $P_{Rec}$

The control unit 19 of the power router 102 measures a power reception performance value $P_{rec}$ indicating a value of power actually received from the designated power transmission/reception leg 11 and outputs the measured power reception performance value $P_{rec}$ to the outside. In the present embodiment, the control unit 19 of the power router 102 outputs the power reception performance value $P_{rec}$ to the management server 1010. Note that measured the power reception performance value is merely an example of information indicating the received power of the power router 102. The received power of the power router 102 can be not only a power value but also a frequency and current, etc.

Step S105: Calculation of Difference $\Delta P$

The power correction unit 1011 of the management server 1010 calculates a difference $\Delta P$ between the target power value $P_{tg}$ and the power reception performance value $P_{rec}$. Specifically, the power reception performance value $P_{rec}$ is subtracted from the target power value $P_{tg}$ and thereby the difference $\Delta P$ is calculated ($P_{tg}-P_{rec}=\Delta P$). The power correction unit 1011 can write the calculated difference $\Delta P$ in the memory device 1012 and read out the written difference $\Delta P$ as appropriate. The power correction unit 1011 can calculate the difference $\Delta P$ and output the difference $\Delta P$ to the management server 1010.

Step S106: Determination of Difference

The power correction unit 1011 determines whether the difference $\Delta P$ falls within a predetermined range. Specifically, the power correction unit 1011 determines whether the difference $\Delta P$ falls within a range between a minimum value $\Delta P_{min}$ and a maximum value $\Delta P_{max}$ ($\Delta P_{min} < \Delta P < \Delta P_{max}$). Note that the minimum value $\Delta P_{min}$ and the maximum value $\Delta P_{max}$ are stored in the memory device 1012. The power correction unit 1011 can appropriately read out the minimum value $\Delta P_{min}$ and the maximum value $\Delta P_{max}$ from the memory device 1012. When $\Delta P_{min} < \Delta P < \Delta P_{max}$, the management server 1010 maintains an operation state of the power network system 1000.

Step S107: Calculation of Corrected Output Power Value $P_{Mod}$

When $\Delta P_{min} \geq \Delta P$ or $\Delta P \geq \Delta P_{max}$, the power correction unit 1011 adds the difference $\Delta P$ to the target power value $P_{tg}$ to calculate a corrected output power value $P_{mod}$ (a second setting power) ($P_{tg}+\Delta P=P_{mod}$). After that, the power correction unit 1011 outputs the corrected output power value $P_{mod}$ to the power router 101.

Step S108: Change of Transmission Power

The control unit 19 of the power router 102 sets the corrected output power value $P_{mod}$ as the output power $P_{out}$ of the designated power transmission/reception leg 11 ($P_{out}=P_{mod}$). Thus, the output power $P_{out}$ of the designated power transmission/reception leg 11 increases by $\Delta P$ from the initial value.

In the case of the designated power transmission/reception between the power routers, there is a chance that the reception-side power router cannot receive the power at the target reception power value of the transmission-side power router. For example, the value of the reception-side power router is smaller (or larger) than the target value of the transmission-side power router due to loss of the transmission line, conversion efficiency, voltage, phase, etc.

On the other hand, in the present configuration, the power router 101 changes the output power $P_{out}$ of the designated power transmission/reception leg 11 to cause the difference $\Delta P$ of the power router 102 to fall within the predetermined range. Thus, the reception power can be the target power value $P_{tg}$ or be within the allowable range near the target power value $P_{tg}$. Note that the output power can be controlled by controlling the current or voltage other than changing the power value.

Second Embodiment

Figure 16:
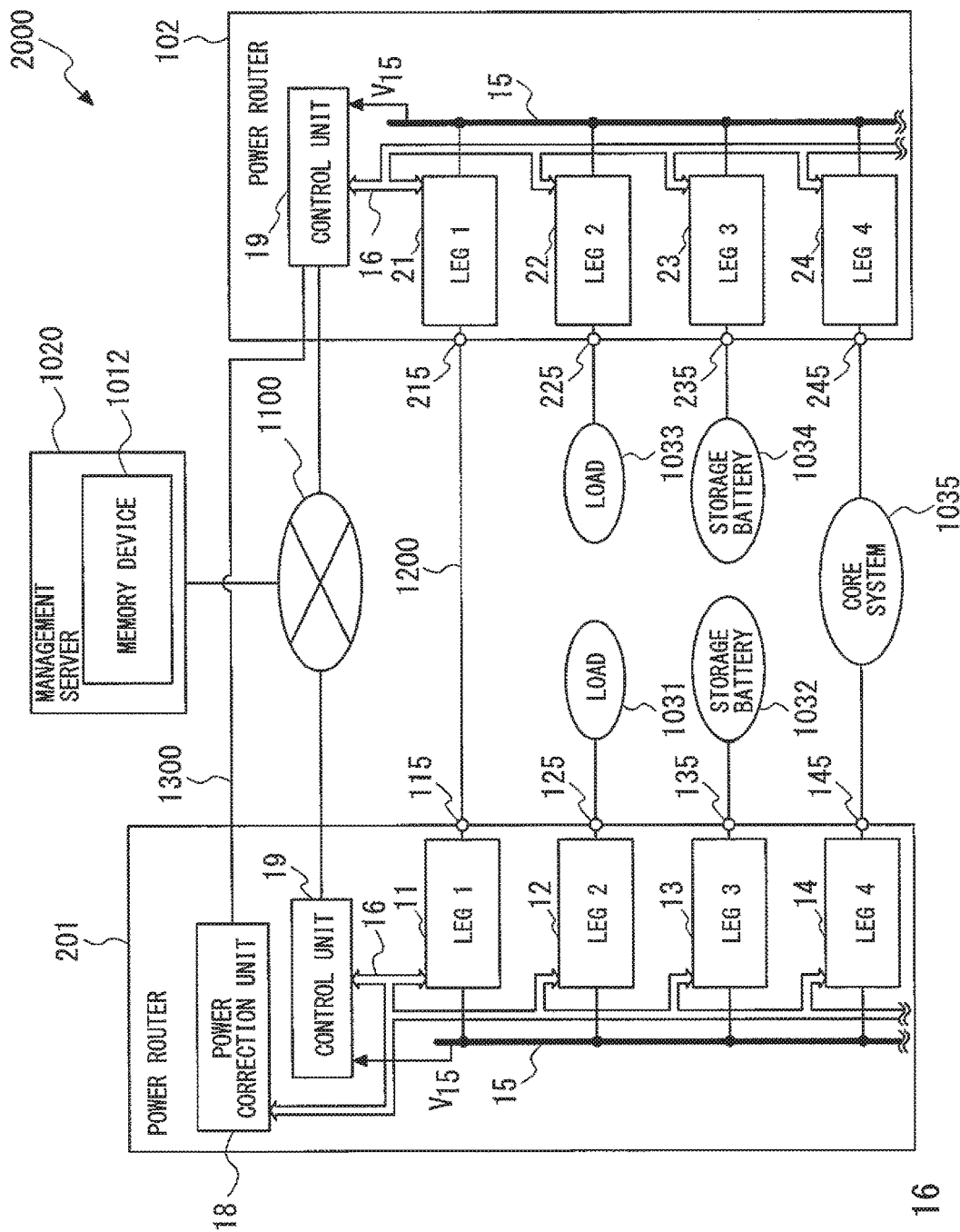
FIG. 16 is a block diagram showing a schematic configuration of a power network system 2000 according to a second embodiment.

Next, a power network system 2000 according to a second embodiment will be described. FIG. 16 is a block diagram showing a schematic configuration of the power network system 2000 according to the second embodiment. The power network system 2000 has a configuration in which the management server 1010 and the power router 101 of the power network system 1000 are replaced with a management server 1020 and a power router 201, respectively, and a communication line 1300 is added. The management server 1020 has a configuration in which the power correction unit 1011 is removed from the management server 1010.

The power router 201 has a configuration in which a power correction unit 18 is added to the power router 101. The power correction unit 18 can be configured as hardware such as a computer. The power correction unit 18 has the same configuration as the power correction unit 1011. The power correction unit 18 performs an operation necessary for controlling the power when the power is transmitted to the stand-alone leg from the designated power transmission/reception leg. The power correction unit 18 stores necessary information for controlling the power when the power is transmitted to the stand-alone leg from the designated power transmission/reception leg, which is described below, therein. Further, the power correction unit 18 of the power router 201 and the control unit 19 of the power router 102 are connected through the communication line 1300. Note that the communication line 1300 can be a wire-communication line or a wireless-communication line. Further, the transmission line 1200 can be used as the communication line 1300 as far as a communication between the power correction unit 18 of the power router 201 and the control unit 19 of the power router 102 is established. Other configuration of the power router 201 is similar to that of the power router 101, so that the description of that will be omitted.

Figure 17:
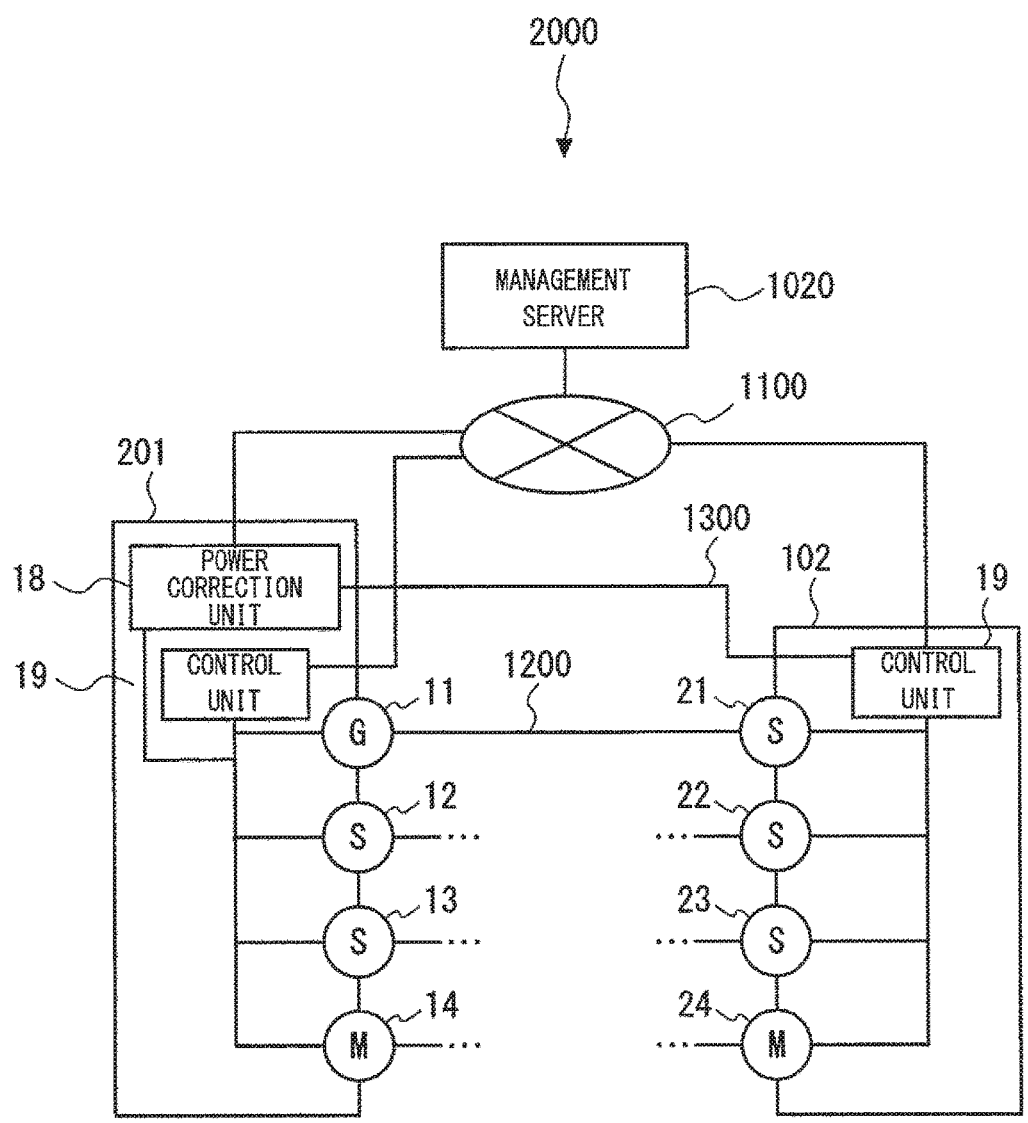
FIG. 17 is a block diagram schematically showing ae configuration of the power network system 2000 when the power is transmitted from the designated power transmission/reception leg to the stand-alone leg.

Next, an operation when the power is transmitted from the designated power transmission/reception leg to another leg will be described. When the power is transmitted from a designated power transmission/reception leg of a power router to another power router, a stand-alone leg is assigned to a reception-side leg. FIG. 17 is a block diagram schematically showing the configuration of the power network system 2000 when the power is transmitted from the designated power transmission/reception leg to the stand-alone leg. In FIG. 17, the legs are represented by circles and signs are illustrated in the circles to indicate the operation mode of the leg. The sings indicating the operation modes are as follows: the master mode is "M"; the designated transmission/reception mode leg is "G"; and the stand alone mode is "S".

Here, similarly to the first embodiment, in the power router 201, the first leg 11 is the designated transmission/reception leg, the second leg 12 and the third leg 13 are the stand-alone legs, and the fourth leg 14 is the master leg. In the power router 102, the first leg 21, the second leg 22 and the third leg 23 are the stand-alone legs, and the fourth leg 24 is the master leg. Hereinafter, the first leg 11 is referred to as a designated power transmission/reception leg 11 and the first leg 21 is referred to as a stand-alone leg 21. In the present configuration, the power control when the power is transmitted from the designated power transmission/reception leg 11 to the stand-alone leg 21 will be described.

Figure 18:
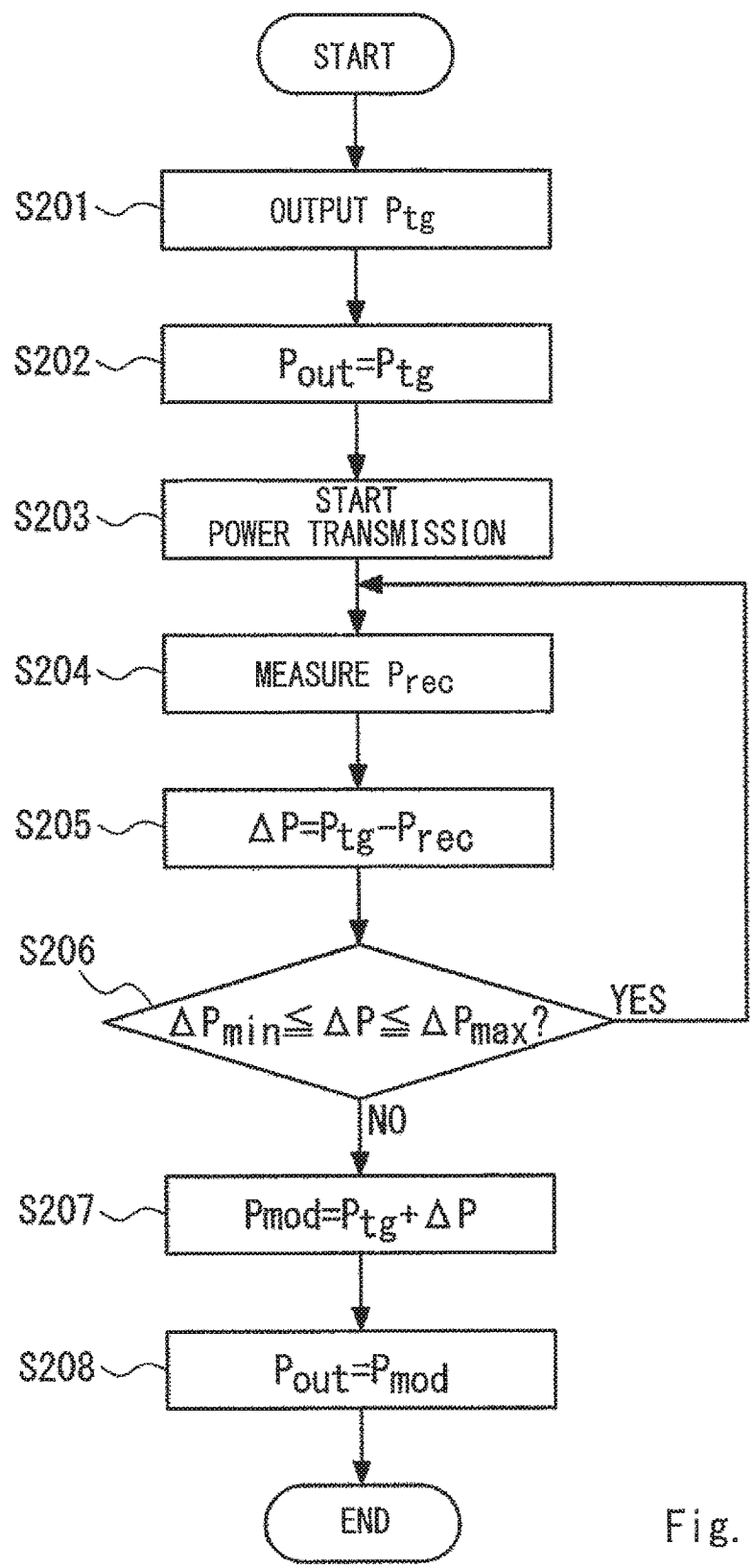
FIG. 18 is a flowchart showing a power control when the power is transmitted from the designated power transmission/reception leg 11 to the stand-alone leg 21.

FIG. 18 is a flowchart showing the power control when the power is transmitted from the designated power transmission/reception leg 11 to the stand-alone leg 21.

Step S201: Output of Target Power Value $P_{Tg}$

The management server 1020 outputs a target power value $P_{tg}$ to the power router 201. The target power value $P_{tg}$ is stored in the control instruction database 196 of the control unit 19 of the power router 201.

Step S202: Setting of Target Power Value $P_{Tg}$

The control unit 19 of the power router 201 sets the target power value $P_{tg}$ as an initial value of output power $P_{out}$ of the designated power transmission/reception leg 11 ($P_{out}=P_{tg}$).

Step S203: Start of Power Transmission

The control unit 19 of the power router 201 causes the designated power transmission/reception leg 11 to start the power transmission to the stand-alone leg 21 at the output power $P_{out}$. As described above, the control unit 19 of the power router 201 controls the power converting unit 111 of the designated power transmission/reception leg 11 and, therefore, the power transmission starts.

Step S204: Measurement of Power Reception Performance Value $P_{Rec}$

The control unit 19 of the power router 102 measures a power reception performance value $P_{rec}$ indicating a value of power actually received from the designated power transmission/reception leg 11 and outputs the measured power reception performance value $P_{rec}$ to the outside. In the present embodiment, the control unit 19 of the power router 102 outputs the power reception performance value $P_{rec}$ to the power correction unit 18 of the power router 201 thorough the communication line 1300.

Step S205: Calculation of Difference $\Delta P$

The power correction unit 18 of the power router 201 calculates a difference $\Delta P$ between the target power value $P_{tg}$ and the power reception performance value $P_{rec}$. Specifically, the power reception performance value $P_{rec}$ is subtracted from the target power value $P_{tg}$ and thereby the difference $\Delta P$ is calculated ($P_{tg}-P_{rec}=\Delta P$). The power correction unit 18 can write the calculated difference $\Delta P$ in the control instruction database 196 and read out the written difference $\Delta P$ as appropriate. The power router 102 can also calculate the difference $\Delta P$ and output the difference $\Delta P$ to the power router 201.

Step S206: Determination of Difference

The power correction unit 18 determines whether the difference $\Delta P$ falls within a predetermined range. Specifically, the power correction unit 18 determines whether the difference $\Delta P$ falls within a range between a minimum value $\Delta P_{min}$ and a maximum value $\Delta P_{max}$ ($\Delta P_{min}<\Delta P<\Delta P_{max}$). Note that the minimum value $\Delta P_{min}$ and the maximum value $\Delta P_{max}$ are included in the control instruction database 196 in advance by the management server 1020. The power correction unit 18 can appropriately read out the minimum value $\Delta P_{min}$ and the maximum value $\Delta P_{max}$ from the control instruction database 196. When $\Delta P_{min}<\Delta P<\Delta P_{max}$, the power correction unit 18 maintains an operation state of the power router 201.

Step S207: Calculation of Corrected Output Power Value $P_{Mod}$

When $\Delta P_{min} \geq \Delta P$ or $\Delta P \geq \Delta P_{max}$, the power correction unit 18 adds the difference $\Delta P$ to the target power value $P_{tg}$ to calculate a corrected output power value $P_{mod}$ ($P_{tg}+\Delta P=P_{mod}$). After that, the power correction unit 18 outputs the corrected output power value $P_{mod}$ to the control unit 19 of the power router 201.

Step S208: Change of Transmission Power

The control unit 19 of the power router 102 sets the corrected output power value $P_{mod}$ as the output power $P_{out}$ of the designated power transmission/reception leg 11 ($P_{out}=P_{mod}$). Thus, the output power $P_{out}$ of the designated power transmission/reception leg 11 increases by $\Delta P$ from the initial value.

As described above, the power router 201 changes the output power $P_{out}$ of the designated power transmission/reception leg 11 to cause the difference $\Delta P$ of the power router 102 to fall within the predetermined value. Thus, the received power can be the target power value $P_{tg}$ or be within the allowable range near the target power value $P_{tg}$. Note that the output power can be controlled by controlling the current or voltage other than changing the power value.

In the present configuration, the power correction unit is provided in the power router. Therefore, it is possible to disperse operations that are necessary for the power control performed by the management server 1010 in the first embodiment to each power router. When number of the power routers controlled by the management server is large, this is advantageous from the view point of decreasing the load of the management server and miniaturizing the management server. The power correction unit can be also provided in the power router 102 of the reception-side.

Third Embodiment

Figure 19:
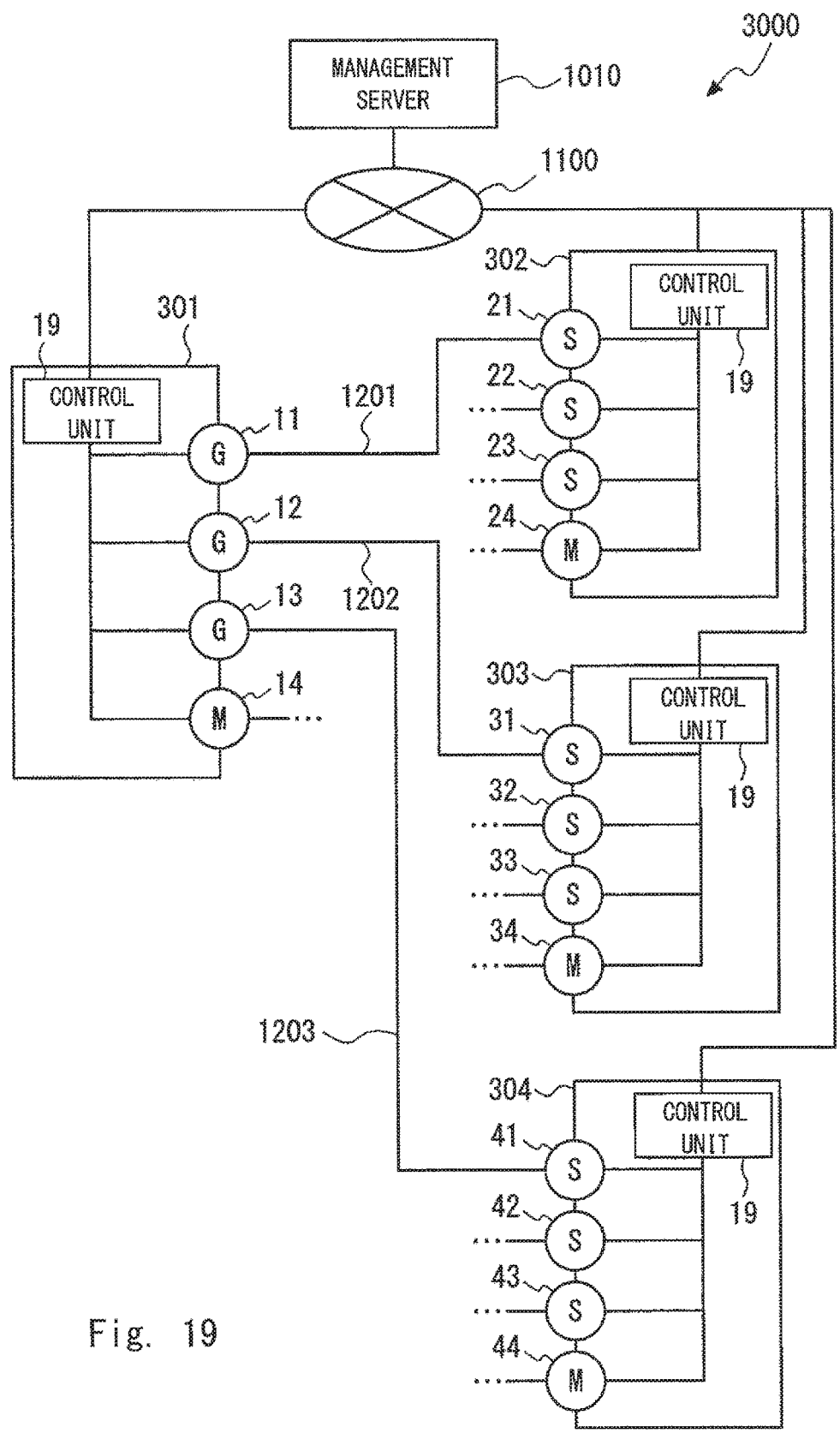
FIG. 19 is a block diagram showing a schematic configuration of a power network system 3000 according to a third embodiment.

Next, a power network system 3000 according to a third embodiment will be described. FIG. 19 is a block diagram showing a schematic configuration of the power network system 3000 according to the third embodiment. The power network system 3000 includes power routers 301 to 304. The power router 301 has the same configuration as the power router 101. Note that the first leg 11, the second leg 12 and the third leg 13 transmit the power as the designated transmission/reception leg. The fourth leg is the master leg. The power routers 302 to 304 have the same configuration as the power router 102.

The power routers 302 to 304 receive the power from the first leg 11, the second leg 12 and the third leg 13 through the transmission lines 1201 to 1203, respectively. The first leg 31, the second leg 32, the third leg 33 and the fourth leg 34 of the power router 303 correspond to the first leg 21, the second leg 22, the third leg 23 and the fourth leg 24 of the power router 201, respectively. The first leg 41, the second leg 42, the third leg 43 and the fourth leg 44 of the power router 304 correspond to the first leg 21, the second leg 22, the third leg 23 and the fourth leg 24 of the power router 201, respectively. In FIG. 19, for simplifying the drawings, the power routers 301 to 304 are shown in a simplified manner.

The target power values $P_{tg2}$ to $P_{tg4}$ corresponding to the power routers 302 to 304 are stored in the control instruction database 196 of the power router 301. The target power values $P_{tg2}$ to $P_{tg4}$ are output from the management server 1010 to the power router 301 and stored therein. The power correction unit 1011 of the management server 1010 calculates differences $\Delta P2$ to $\Delta P4$ of the power routers 302 to 304 in the same steps as the first embodiment. Then, the power correction unit 1011 outputs corrected output power values $P_{mod2}$ to $P_{mod4}$, which correspond to the power routers 302 to 304, respectively, as appropriate. Thus, the power received by the power routers 302 to 304 can be controlled in the power network system 3000.

When the power is controlled, the power correction unit 1011 determines whether the power router has ability of the power control. In sum, the power correction unit 1011 determines whether a rated output power $P_r$ satisfies a following expression (1). i in the expression (1) represents the number of the power routers.

[Expression 1]

$$P_r > \sum_{i=2}^{4} (P_{tg} + \Delta Pi) \quad (1)$$

When the expression (1) is satisfied, when the first leg 11 to the third leg 13 are controlled, total quantity of the powers which the power router 301 transmits the power routers 302 to 304 falls within the rated output power $P_r$. Therefore, the power correction unit 1011 performs the power controls with respect to the first leg 11 to the third leg 13 of the power router 301.

When the expression (1) is not satisfied, the total quantity of the powers that the power router 301 transmits to the power routers 302 to 304 exceeds the rated output power $P_r$ when the power controls of the first leg 11 to the third leg 13 are performed. Therefore, the power router 301 notifies the management server 1010 that the power controls of all of the first leg 11 to the third leg 13 cannot be performed. The management server 1010 receives the notification that the power controls cannot be performed, and, thereby, can take measures such as reconsideration of a plan for power interchange in the power network system 3000.

Note that, when there is any leg in the first leg 11 to the third leg 13 the difference of which is a plus value, or the output power $P_{out}$ of which is excessive, it is desirable that the power control of the leg the output power $P_{out}$ of which is excessive is firstly preferentially performed. Thus, it is possible to reliably prevent cases where the total quantity of the powers transmitted to the power routers 302 to 304 exceeds the rated output power $P_r$.

As described above, according to the present configuration, when the transmission-side power router transmits the powers to a plurality of the reception-side power routers, it is possible to refer to the own rated output power and evaluate the possibility of the power transmission.

Fourth Embodiment

Figure 20:
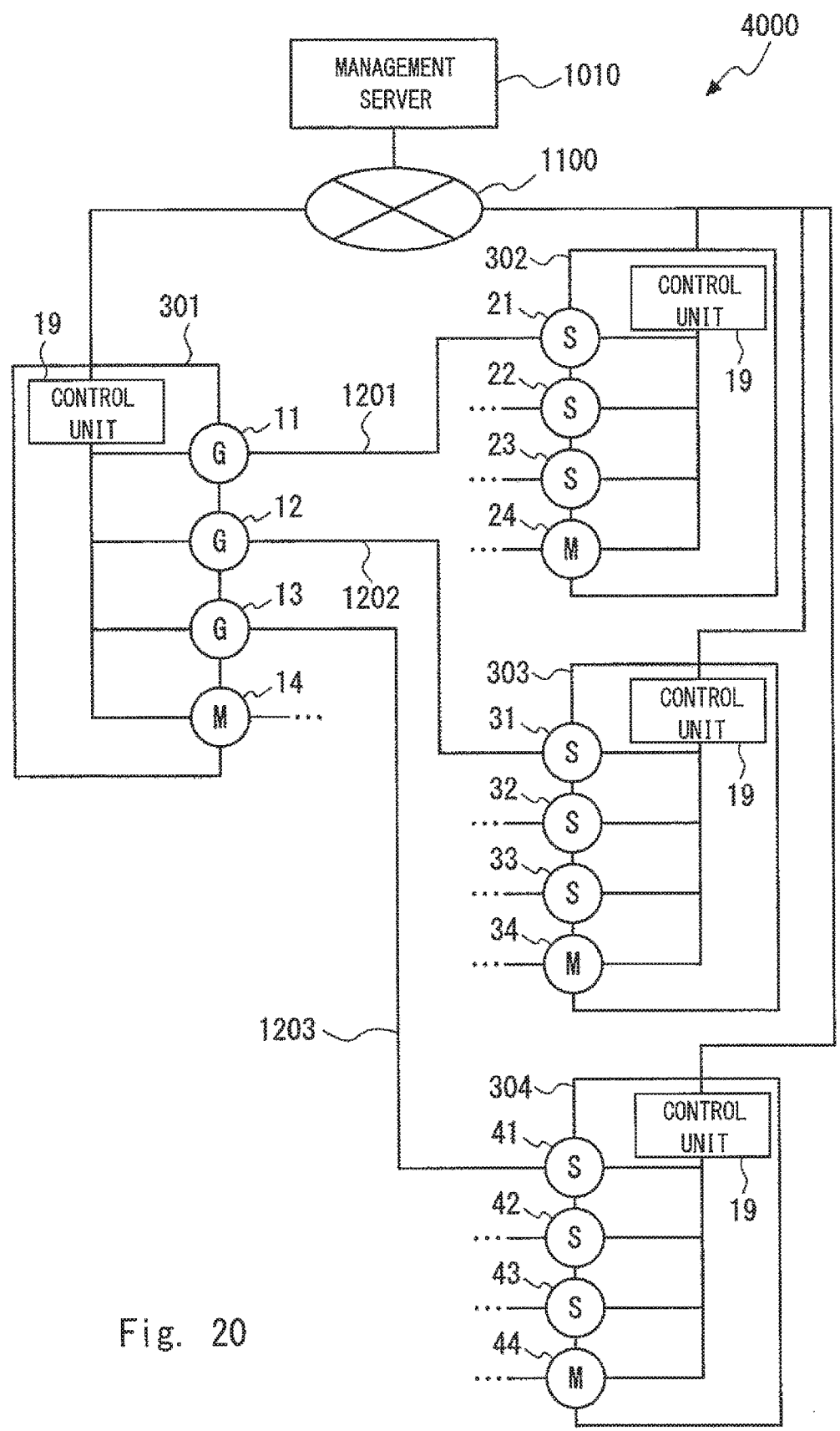
FIG. 20 is a block diagram showing a schematic configuration of a power network system 4000 according to a fourth embodiment.

Next, a power network system 4000 according to a fourth embodiment will be described. FIG. 20 is a block diagram showing a schematic configuration of the power network system 4000 according to the fourth embodiment. The power network system 4000 has the same configuration as the power network system 3000, and thereby the detailed description will be omitted.

In the embodiment, an example where the management server 1010 is notified that the power controls of all of the first leg 11 to the third leg 13 cannot be performed is described. In the present embodiment, a specific example of measures taken by the management server 1010 when receiving the notification that the power controls cannot be performed.

The management server 1010 changes the output powers of the designated power transmission/reception leg in the first leg 11 to the third leg 13 of the power router 301 when receiving the notification that the power controls cannot be performed. Specifically, the management server 1010 averages each of the output powers of the first leg 11 to the third leg 13. In sum, the management server 1010 controls the power network system 4000 to satisfy $P_{mod1}=P_{mod2}=P_{mod3}=\frac{1}{3}P_r$.

As described above, according to the present configuration, when the transmission-side power router transmits the power to a plurality of the reception-side power routers, it is possible to refer to the own rated output power and evaluate the possibility of the power transmission. Then, when the output power required of the transmission-side power router exceeds the rating of the transmission-side power router, the output powers of the designated power transmission/reception legs are averaged within the range of the rating, respectively. Thus, the transmission-side power router can transmit the power to a plurality of the reception-side power routers within the range of the rating of the designated power transmission/reception mode. Accordingly, although the transmission power energy is limited, the power transmission can be maintained.

Note that, in this case, when the received power of the reception-side power router is short, the reception-side power router can increase the power supply through the master leg and solve the power shortage. The management server 1010 can solve the power shortage of the reception-side power router by increasing the transmission power energy to the reception-side power router from other routers.

Fifth Embodiment

Figure 21:
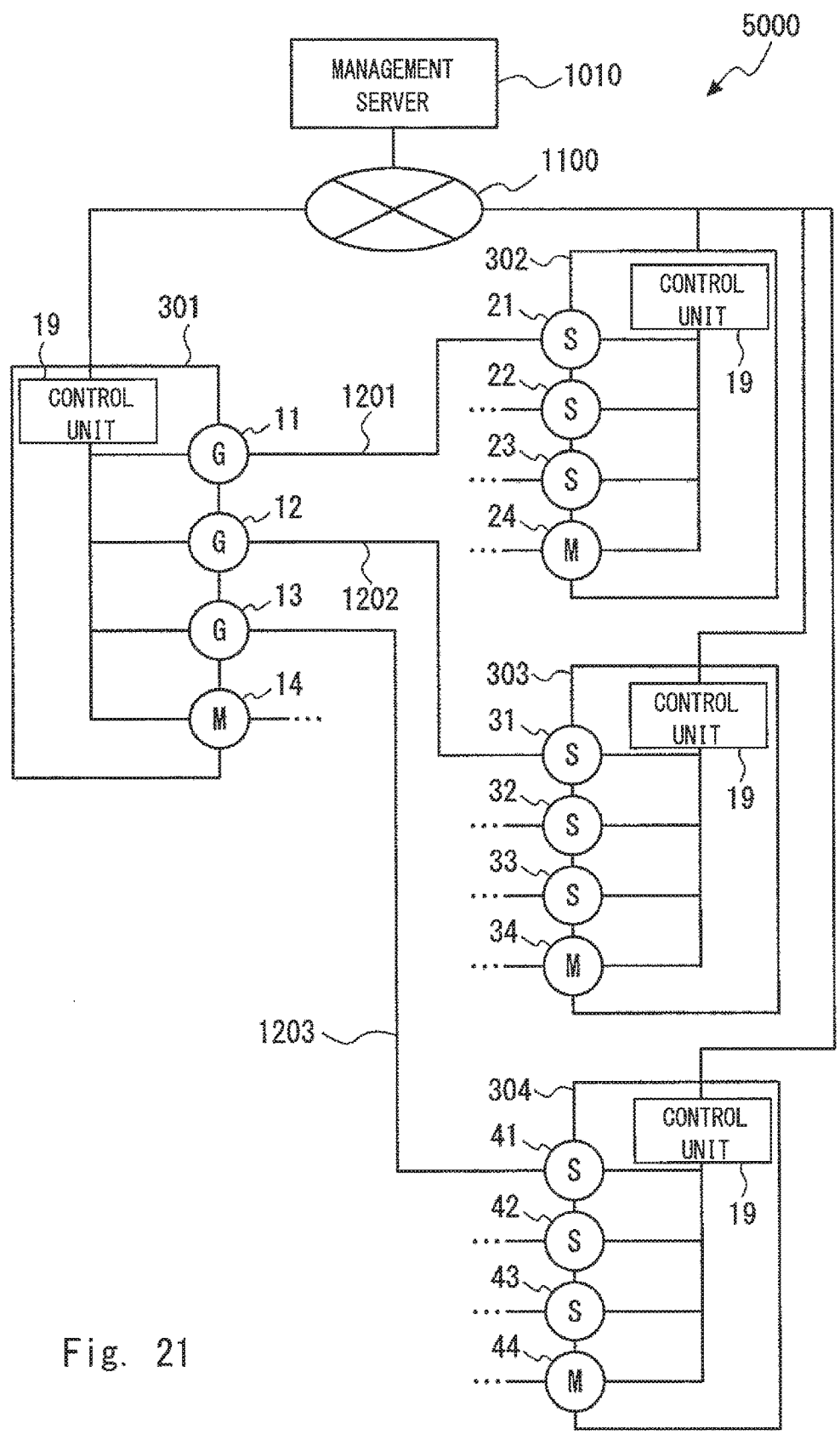
FIG. 21 is a block diagram showing a schematic configuration of a power network system 5000 according to a fifth embodiment.

Next, a power network system 5000 according to a fifth embodiment will be described. FIG. 21 is a block diagram showing a schematic configuration of the power network system 5000 according to the fifth embodiment. The power network system 5000 has the same configuration as the power network system 3000, and thereby the detailed description will be omitted.

An example where the power router 301 notifies the management server 1010 that the power controls of the first leg 11 to the third leg 13 cannot be performed when the expression (1) described in the third embodiment is not satisfied is described. In the present embodiment, another specific example of measures taken by the management server 1010 when receiving the notification that the power controls cannot be performed.

The management server 1010 changes the output powers of the first leg 11 to the third leg 13 when receiving the notification that the power controls cannot be performed. Specifically, the management server 1010 corrects the output powers based on the priority order of the first leg 11 to the third leg 13 of the power router 301.

Hereinafter, the priority of the first leg 11 is the highest, the priority of the second leg 12 is the second highest, and the priority of third leg 13 is the lowest. The management server 1010 sets the output powers within the range of the rating of the power router 301 according to the priorities. Note that the priority described here indicates the order of the legs that should receive the power of the initial target power value. Therefore, for example, it is possible to consider that a power router connected to the power consumption object that is highly public, a power router connected to the power consumption object that has to be prevented from the power outage, or the like is treated as a high-priority power router. Further, the priority can be flexibly set in descending order of the required powers of the reception-side legs, in descending order of capacities of the transmission lines between the legs, or the like, as appropriate. The priority of each leg can be notified to the control unit 19 of the power router 301 from the management server 1010 at the time of setting a destination of each leg.

For example, an example where the management server 1010 can control the powers of the first leg 11 and the second leg 12 as described in the first embodiment and, however, the rating of the power router 301 is exceeded when controlling the powers of all of the first leg 11 to the third leg 13 as described in the first embodiment will be described. In this case, the power controls of the first leg 11 and the second leg 12 described in the first embodiment are performed and the rest power of the rating is set to the third leg 13 as $P_{mod3}$. In sum, $P_{mod3}=P_r-P_{mod1}-P_{mod2}$.

As described above, according to the present configuration, when the transmission-side power router transmits the power to a plurality of the reception-side power routers, it is possible to refer to the own rated output power and evaluate the possibility of the power transmission. Then, when the output power required of the transmission-side power router exceeds the rating of the transmission-side power router, the powers are controlled in descending order of the priorities of the designated power transmission/reception legs. Then, the transmission power of the low-priority router is limited and thereby the power transmission can be maintained.

Note that, in this case, when the received power of the reception-side power router the priority of which is low is short, the reception-side router can increase the power supply through the master leg and solve the power shortage. The management server 1010 can solve the power shortage of the reception-side power router by increasing the transmission power energy to the reception-side power router from other routers.

Sixth Embodiment

Figure 22:
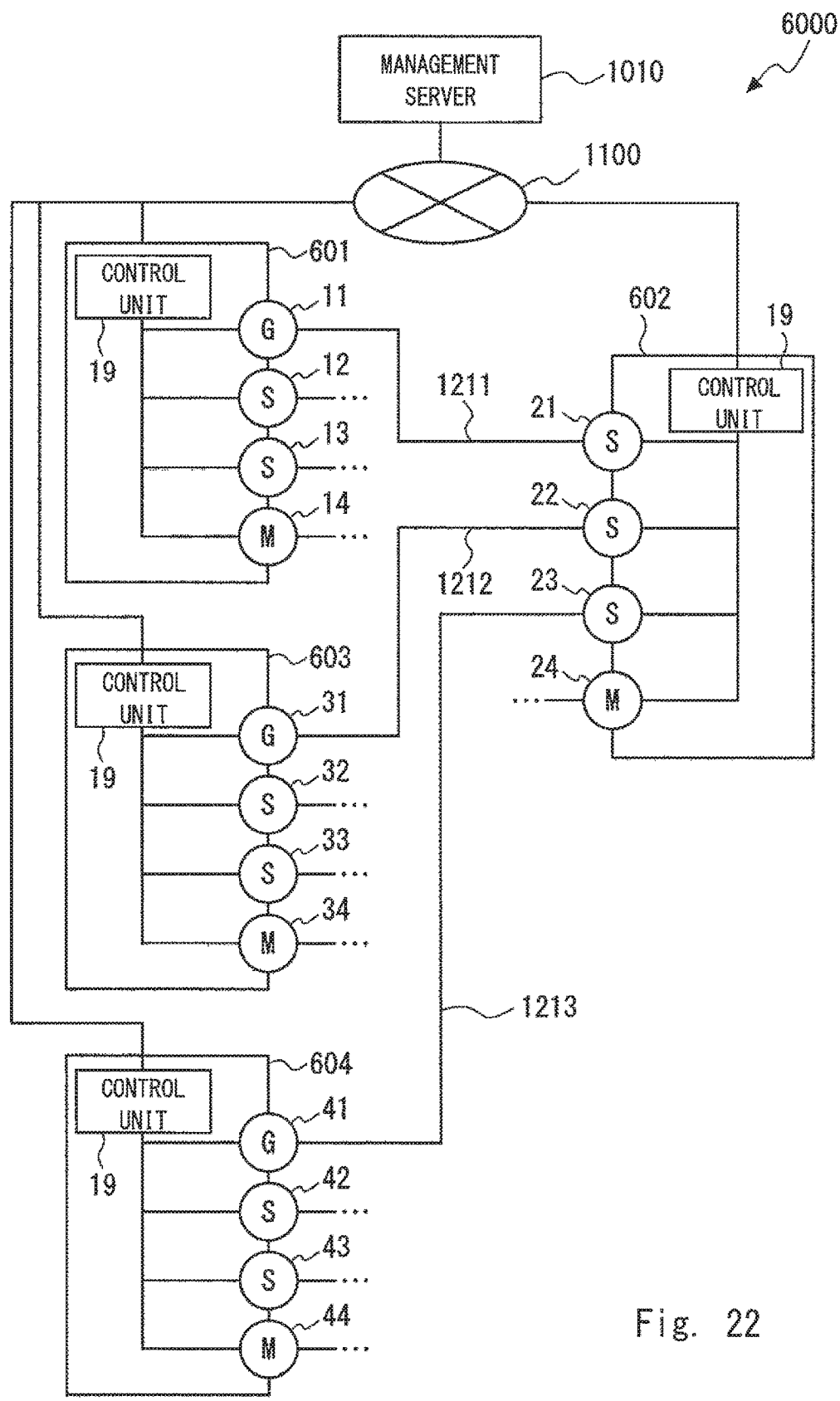
FIG. 22 is a block diagram showing a schematic configuration of a power network system 6000 according to a sixth embodiment.

Next, a power network system 6000 according to a sixth embodiment will be described. FIG. 22 is a block diagram showing a schematic configuration of the power network system 6000 according to the sixth embodiment. The power network system 6000 includes power routers 601 to 604. The power routers 601, 603 and 604 have the same configuration as the power router 101. The power router 602 has the same configuration as the power router 102. A first leg 31, a second leg 32, a third leg 33 and a fourth leg 34 of the power router 603 correspond to the first leg 11, the second leg 12, the third leg 13 and the fourth leg 14 of the power router 101, respectively. A first leg 41, a second leg 42, a third leg 43 and a fourth leg 44 of the power router 604 correspond to the first leg 11, the second leg 12, the third leg 13 and the fourth leg 14 of the power router 101, respectively. For simplifying the drawings, in the FIG. 22, the power routers 601 to 604 are illustrated in a simplified manner.

In the power routers 601, 603 and 604, the first legs 11, 31 and 41 transmit the power as the designated power transmission/reception leg, respectively. The first leg 21 of the power routers 602 receives the power from the first leg 11 of the power router 601 through the transmission line 1211. The second leg 22 of the power routers 602 receives the power from the first leg 31 of the power router 603 through the transmission line 1212. The third leg 23 of the power routers 602 receives the power from the first leg 41 of the power router 604 through the transmission line 1213.

Target power values $P_{tg61}$ to $P_{tg63}$ corresponding to the first leg 21 to the third leg 23 are stored in the control instruction databases 196 of the power routers 601, 603 and 604. The target power values $P_{tg61}$ to $P_{tg63}$ are output to the power routers 601, 603 and 604 and stored therein. The power correction unit 1011 of the management server 1010 calculates differences ΔP11 to ΔP13 of the first leg 21 to the third leg 23 in the same procedure as the first embodiment. Then, the power correction unit 1011 outputs corrected output power values $P_{mod61}$ to $P_{mod63}$ according to the differences ΔP11 to ΔP13, respectively. Thus, in the power network system 6000, the powers received by the first leg 21 to the third leg 23 of the power router 602 can be controlled.

When the power is controlled, the power correction unit 1011 determines whether each of the power routers 601, 603 and 604 has ability of the power control. In sum, the power correction unit 1011 confirms whether a total value of the power output from each of the power routers 601, 603 and 604 falls within rated output powers $P_{r1}$ to $P_{r3}$ of the power routers 601, 603 and 604 when the corrected output power values $p_{mod1}$ to $P_{mod3}$ are applied to the power routers 601, 603 and 604.

Then, when the total value of the power output from each of the power routers 601, 603 and 604 falls within the rated output powers $P_{r1}$ to $P_{r3}$ of the power routers 601, 603 and 604, the power routers 601, 603 and 604 are caused to perform the power controls.

Then, when the total value of the power output from each of the power routers 601, 603 and 604 is larger than the rated output powers $P_{r1}$ to $P_{r3}$ of the power routers 601, 603 and 604, the power routers 601, 603 and 604 are caused not to perform the power controls.

When there is any leg that is caused not to control the power, the shortage of the received power occurs in the power router 602. Therefore, the power correction unit 1011 can take measures such as increasing the transmission power to the power router 602 or increasing the receiving power of the master leg of the power router 602.

As described above, according to the present configuration, when a plurality of the power routers transmit the power to one power router in the designated power transmission/reception mode, the power can be controlled.

Note that the order of the power controls of the power routers 601, 603 and 604 can be provided and the power controls can be performed in descending order. Further, the transmission power energies to the power router 604 from the power routers 601, 603 and 604 can be averaged/

Other Embodiments

Further, the present invention is not limited to the above-described embodiments, and needless to say, various modifications can be made without departing from the spirit and scope of the present invention described above. For example, although the control unit 19, the power correction unit 18 and the power correction unit 1011 are described as hardware configurations in the above-described embodiments, it is not limited to the hardware configurations. The control unit 19, the power correction unit 18 and the power correction unit 1011 may be configured by a computer and arbitrary processing can be also implemented by causing a CPU (Central Processing Unit) to execute a computer program. The power converting unit incorporates a control device therein, and the control devise is, for example, a dynamic reconfiguration logic (FPGA: Field Programmable Gate Array). A content of the control program of the FPGA is changed to suit the mode of the legs, and then the control program operates. Thus, scale of the hardware and a cost can be decreased, because an operation can be controlled according to the operation mode by rewriting the FPGA according to a type of the leg and the operation.

The power router 301 and the management server 1010 according to the third to fifth embodiments can be replaced with the power router 201 and the management server 1020 according to the second embodiment, respectively. In this case, communication lines are provided between the power router 201 and the control unit 19 of each of the power routers 302 to 304.

The power router 601, 603 and 604, and the management server 1010 according to the sixth embodiment can be replaced with the power router 201 and the management server 1020 according to the second embodiment, respectively. In this case, communication lines are provided between the power correction unit 18 of each of power router 601, 603 and 604, and the control unit 19 of the power routers 602.

A multistage power network system where three or more power routers according to each embodiment are connected can be configured. In this case, the output can be corrected by controlling the power receiving of the receiving-side power router between the adjacently connected power routers.

Further, although the power received by the receiving-side power router is measured in the embodiments described above, a setting power of the transmission power can be determined by memorizing the result of the power control (e.g., memorizing the value of ΔP of each combination of the power routers) without measuring in each power transmission/reception.

Although the present invention is explained above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent applications No. 2013-186889, filed on Sep. 10, 2013, the disclosure of which is incorporated herein in its entirety by reference.

REFERENCE SIGNS LIST

BL BRANCH LINE
D1-D6 DIODES
MODE OPERATION MODE DESIGNATION INFORMATION
$P_{mod}$, $P_{mod2}$–$P_{mod4}$, $P_{mod61}$–$P_{mod63}$ CORRECTED OUTPUT POWER VALUES
$P_{out}$ OUTPUT POWER
$P_{rec}$ POWER RECEPTION PERFORMANCE VALUE
$P_{tg}$, $P_{tg2}$–$P_{tg4}$, $P_{tg61}$–$P_{tg63}$ TARGET POWER VALUES
Q1-Q6 TRANSISTORS
SA1, SD1 WAVEFORM INSTRUCTION SIGNALS
SA2, SD2 READOUT SIGNALS
SCON CONTROL SIGNAL
SIG1 SWITCHING CONTROL SIGNAL
$V_{15}$ BUS VOLTAGE
Vr DETECGTED VALUE
ΔP, ΔP11–ΔP13, ΔP1–ΔP3 DIFFERENCES
11, 21, 32, 42 FIRST LEGS
12, 22, 32, 42 SECOND LEGS
13, 23, 33, 43 THIRD LEGS
14, 24, 34, 44 FOURTH LEGS
15, M101, M201, M301, M401, M501, M601 DC BUSES
16 COMMUNICATION BUS
17 VOLTAGE SENSOR
18 POWER CORRECTION UNIT
19 CONTROL UNIT
51 CONTROL INSTRUCTION
52 INFORMATION
60 THROUGH LEG
71A, 71B TRANSMISSION LINES
72 DISTRIBUTION LINE
100, 110, 101, 102, 170, 200, 201, 210, 220, 230, 240, 250, 260, 300, 310, 320, 350, 360, 400, 410, 420, 301-304, 500, 510, 600, 610, 601-606, 841-844 POWER ROUTERS
821-824 POWER CELLS
111, 121, 131, 141 POWER CONVERTING UNITS
112, 122, 132, 142, 162 CURRENT SENSORS
113, 223, 133, 143, 163 SWITCHES
114, 224, 134, 144, 164 VOLTAGE SENSORS 115, 125, 135, 145, 165, 215, 225, 235, 245 CONNECTION TERMINALS
191 MEMORY UNIT
192 OPERATION MODE MANAGEMENT UNIT
193 POWER CONVERSION INSTRUCTION UNIT
194 DA/AD CONVERSION UNIT
195 SENSOR-VALUE READOUT UNIT
196 CONTROL INSTRUCTION DATABASE
197 LEG IDENTIFICATION INFORMATION DATABASE
245 CONNECTION TERMINAL
810, 1000, 2000, 3000, 4000, 5000, 6000 POWER NETWORK SYSTEMS
811, 1035, 1035A-1035C CORE SYSTEMS
812 LARGE-SCALE POWER PLANT
831 HOUSE
832 BUILDING
833 SOLAR PANEL
834 WIND POWER GENERATOR
835, 1032, 1034 STORAGE BATTERIES
850, 1010, 1020 MANAGEMENT SERVERS
860, 1100 COMMUNICATION NETWORKS
1011 POWER CORRECTION UNIT
1012 MEMORY DEVICE
1031, 1033 LOADS
1200, 1201-1203, 1211-1213 TRANSMISSION LINES
1300 COMMUNICATION LINE

The invention claimed is:

1. A power network system comprising:
a first power router comprising a power converting leg that transmits power;
a second power router comprising a power converting leg that receives the power from the first power router and a controller configured to obtain information indicating received power; and
a management server comprising a power correction processor configured to control the power transmitted by the first power router based on the information indicating the received power,
wherein the management server controls the power transmitted by the first power router when a difference between the power received by the second power router and a target value of power is outside a predetermined range.

2. The power network system according to claim 1, wherein the management server controls the power transmitted by the first power router by notifying the first power router of a value of power to be transmitted by the first power router.

3. The power network system according to claim 1, wherein the management server:
updates a value of power to be transmitted by the first power router by adding the difference to the value of power to be transmitted by the first power router; and
controls the power transmitted by the first power router by notifying the first power router of the updated value of power to be transmitted by the first power router.

4. The power network system according to claim 1, wherein the management server receives the information indicating the received power from the second power router and calculates the difference by subtracting the received power by the second power router from the target value.

5. The power network system according to claim 1, wherein the second power router outputs the difference between the power received by the second power router and the target value to the management server.

6. A power network system comprising:
a first power router comprising n (n is an integer equal to or more than two) first power converting legs that transmit power;
n second power routers, each second power router comprising a second power converting leg that receives the power from the first power router and a controller configured to obtain information indicating the received power, the n second power routers respectively receiving the powers from the n first power converting legs; and
a management server comprising a power correction processor configured to control the powers transmitted by the n first power converting legs based on the information indicating the powers received by the n second power routers from the n first power converting legs, respectively.

7. The power network system according to claim 6, wherein the management server does not control the powers transmitted from the n first power converting legs when a total value of the powers transmitted by the n first power converting legs is larger than a rating of the first power router.

8. The power network system according to claim 6, wherein the management server averages the powers transmitted from the n first power converting legs when a total value of the powers transmitted by the n first power converting legs is larger than a rating of the first power router.

9. The power network system according to claim 6, wherein, when a total value of the powers transmitted by the n first power converting legs is larger than a rating of the first power router, the management server controls power transmitted by a high-priority first power converting leg among the n first power converting legs within a range satisfying the rating and does not control powers transmitted from the other first power converting legs among the n first power converting legs.

10. A power network system comprising:
m (m is an integer equal to or more than two) first power routers, each first power router comprising a first power converting leg that transmits power;
a second power router comprising m second power converting legs that respectively receive the powers from the m first power routers without overlaps; and
a management server comprising a power correction processor configured to control the powers transmitted by the m first power routers based on information indicating the received powers.

11. A power network system comprising:
a first power router comprising a power converting leg that transmits power, and a power correction processor configured to control the power transmitted by the first power router; and
a second power router comprising a power converting leg that receives the power from the first power router and a controller configured to obtain information indicating received power, wherein
the power correction processor is further configured to control the power transmitted by the first power router based on the information indicating the received power, and
the power transmitted by the first power router is controlled when the difference between the power received the second power router and a target value of power is outside a predetermined range.

12. A power network system comprising:
a first power router comprising a power converting leg that transmits power;

a second power router comprising a power converting leg that receives the power from the first power router, a controller configured to obtain information indicating received power, and a power correction processor configured to control the power transmitted by the first power router, wherein
 the power correction processor configured to control the power transmitted by the first power router based on the information indicating the received power, and
 the power transmitted by the first power router is controlled when the difference between the power received the second power router and a target value of power is outside a predetermined range.

13. A power router comprising:
a power converting leg that transmits power to another power router; and
a power correction processor configured to control the power transmitted to the another power router based on information indicating power received by the another power router,
wherein the power transmitted by the power converting leg is controlled when the difference between the power received by the another power router and a target value of power is outside a predetermined range.

14. A power router, comprising:
a power converting leg that transmits power; and
a power correction processor configured to obtain information indicating power received by another power router from the power router, and control the power received by the another power router based on the information indicating the received power,
wherein the power transmitted by the power converting leg is controlled when the difference between the power received by the another power router and a target value of power is outside a predetermined range.

15. A power router comprising:
a DC bus of which voltage is maintained at a voltage level;
a plurality of power converting legs having functions of bi-directionally converting power between a first connection terminal and a second connection terminal, the first connection terminals of the plurality of power converting legs being connected to the DC bus, the second connection terminals of the plurality of power converting legs being connected to outside destinations as external connection terminals; and
a control unit configured to control operations of the plurality of power converting legs, wherein
 any of the plurality of power converting legs receives the power from another power router transmitting power at a first setting power and the other power router includes a power correction unit configured to perform a control to cause power received from the other power router to be the first setting power, and
 the control unit measure the power received from the other power router and output a measurement result to the power correction unit of the other power router.

16. A non-transitory computer readable media storing a management device control program which, when executed, causes a computer to execute:
 causing a first power router to transmit power to a second power router at a first setting power;
 causing the second power router to measure power received by the second power router; and
 controlling the power transmitted from the first power router to cause the power received by the second power router to be the first setting power,
 wherein the power transmitted by the first power router is controlled when the difference between the power received by the second power router and a target value of power is outside a predetermined range.

17. A management server comprising a processor configured to perform:
 causing a first power router to transmit power to a second power router at a first setting power;
 causing the second power router to measure power received by the second power router; and
 controlling the power transmitted from the first power router to cause the power received by the second power router to be the first setting power,
 wherein the power transmitted by the first power router is controlled when the difference between the power received by the second power router and a target value of power is outside a predetermined range.

18. A control method of a power network system, comprising:
 causing a first power router to transmit power to a second power router at a first setting power;
 causing the second power router to measure power received by the second power router; and
 controlling the power transmitted from the first power router to cause the power received by the second power router to be the first setting power,
 wherein the power transmitted by the first power router is controlled when the difference between the power received by the second power router and a target value of power is outside a predetermined range.

19. A power network system comprising:
a first power router that transmits power; and
a second power router that receives the power from the first power router and obtains information indicating received power, wherein
 the first power router comprises a power correction processor configured to control the power transmitted by the first power router based on the information indicating the received power, and
 the power transmitted by the first power router is controlled when the difference between the power received by the second power router and a target value of power is outside a predetermined range.

20. A power network system comprising:
a first power router that transmits power; and
a second power router that receives the power from the first power router and obtains information indicating received power, wherein
 the second power router comprises a power correction processor configured to control the power transmitted by the first power router based on the information indicating the received power, and
 the power transmitted by the first power router is controlled when the difference between the power received by the second power router and a target value of power is outside a predetermined range.

21. A power router comprising control means for controlling power transmitted to another power router based on information indicating power received by the another power router,
 wherein the power transmitted by the power router is controlled when the difference between the power received by the second power router and a target value of power is outside a predetermined range.

22. A power router comprising:
a DC bus of which voltage is maintained at a voltage level;
a plurality of power converting legs having functions of bi-directionally converting power between a first connection terminal and a second connection terminal, the first connection terminals of the plurality of power converting legs being connected to the DC bus, the second connection terminals of the plurality of power converting legs being connected to outside destinations as external connection terminals; and
control means for controlling operations of the plurality of power converting legs, wherein
any of the plurality of power converting legs receives the power from another power router transmitting power at a first setting power and the other power router includes power correction means for performing a control to cause power received from the other power router to be the first setting power, and
the control means measure the power received from the other power router and output a measurement result to the power correction means of the other power router.

* * * * *